(12) United States Patent
Wiser

(10) Patent No.: US 9,366,570 B1
(45) Date of Patent: Jun. 14, 2016

(54) PHOTODIODE OPERABLE IN PHOTOCONDUCTIVE MODE AND PHOTOVOLTAIC MODE

(71) Applicant: Google Inc., Mountain View, CA (US)

(72) Inventor: Robert Francis Wiser, Cupertino, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 111 days.

(21) Appl. No.: 14/202,927

(22) Filed: Mar. 10, 2014

(51) Int. Cl.
| | | |
|---|---|---|
| *G01J 1/46* | (2006.01) | |
| *G02C 5/22* | (2006.01) | |
| *G02C 7/04* | (2006.01) | |

(52) U.S. Cl.
CPC ..... *G01J 1/46* (2013.01); *G02C 7/04* (2013.01)

(58) Field of Classification Search
CPC .................. G01J 2001/446; G01J 2001/4466; H03G 3/20; H03G 3/3084
USPC ................ 250/214 R, 214.1, 214 AG, 214 C
See application file for complete search history.

(56) References Cited

U.S. PATENT DOCUMENTS

| | | | |
|---|---|---|---|
| 3,958,560 A | 5/1976 | March | |
| 4,014,321 A | 3/1977 | March | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,214,014 A | 7/1980 | Hofer et al. | |
| 4,309,085 A | 1/1982 | Morrison | |
| 4,312,575 A | 1/1982 | Peyman et al. | |
| 4,401,371 A | 8/1983 | Neefe | |

(Continued)

FOREIGN PATENT DOCUMENTS

| | | |
|---|---|---|
| EP | 0369942 | 5/1990 |
| EP | 0686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

(Continued)

*Primary Examiner* — Renee D Chavez
(74) *Attorney, Agent, or Firm* — McDonnell Boehnen Hulbert & Berghoff LLP

(57) ABSTRACT

A body-mountable device equipped with a light sensor is disclosed. The light sensor includes a photodiode that operates in either a photoconductive mode or a photovoltaic mode depending on whether the photodiode is reverse biased. A group of switches are arranged to selectively couple the photodiode to first and second voltage sources to configure the photodiode to operate in either mode. A controller selects a mode of operation of the photodiode and controls the switches to cause the photodiode to respond to incident light while operating in the selected mode. The controller then obtains a measurement from the photodiode indicative of the intensity of light received during an exposure interval. The light sensor can thus include a single photodiode and yet be used to alternately obtain measurements based on the photoconductive response of the photodiode or based on the photovoltaic response of the photodiode.

19 Claims, 10 Drawing Sheets

(56) References Cited

U.S. PATENT DOCUMENTS

| | | |
|---|---|---|
| 4,463,149 A | 7/1984 | Ellis |
| 4,555,372 A | 11/1985 | Kunzler et al. |
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint et al. |
| 5,177,165 A | 1/1993 | Valint et al. |
| 5,177,168 A | 1/1993 | Baron et al. |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicolson et al. |
| 5,908,906 A | 6/1999 | Kunzler et al. |
| 5,969,809 A * | 10/1999 | Nishina ............... G01J 1/20 356/227 |
| 5,981,669 A | 11/1999 | Valint et al. |
| 6,087,941 A | 7/2000 | Ferraz et al. |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 8,519,340 B2 | 8/2013 | Frach et al. |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2009/0256938 A1 * | 10/2009 | Bechtel ............... H04N 5/374 348/302 |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2010/0265076 A1 * | 10/2010 | Ichino ............... H01S 5/06804 340/584 |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |

(56) References Cited

U.S. PATENT DOCUMENTS

| | | |
|---|---|---|
| 2012/0092612 A1 | 4/2012 | Binder et al. |
| 2012/0109296 A1 | 5/2012 | Fan |
| 2012/0177576 A1 | 7/2012 | Hu |
| 2012/0201755 A1 | 8/2012 | Rozakis et al. |
| 2012/0245444 A1 | 9/2012 | Otis et al. |
| 2012/0259188 A1 | 10/2012 | Besling |

FOREIGN PATENT DOCUMENTS

| | | |
|---|---|---|
| EP | 1061874 | 12/2000 |
| EP | 1818008 | 8/2007 |
| EP | 1947501 | 7/2008 |
| EP | 1617757 | 8/2009 |
| EP | 2457122 | 5/2012 |
| WO | 95/04609 | 2/1995 |
| WO | 01/16641 | 3/2001 |
| WO | 01/34312 | 5/2001 |
| WO | 03/065876 | 8/2003 |
| WO | 2004/060431 | 7/2004 |
| WO | 2004/064629 | 8/2004 |
| WO | 2006/015315 | 2/2006 |
| WO | 2009/094643 | 7/2009 |
| WO | 2010/105728 | 9/2010 |
| WO | 2010/133317 | 11/2010 |
| WO | 2011/011344 | 1/2011 |
| WO | 2011/034592 | 3/2011 |
| WO | 2011/035228 | 3/2011 |
| WO | 2011/035262 | 3/2011 |
| WO | 2011/083105 | 7/2011 |
| WO | 2011/163080 | 12/2011 |
| WO | 2012/035429 | 3/2012 |
| WO | 2012/037455 | 3/2012 |
| WO | 2012/051167 | 4/2012 |
| WO | 2012/051223 | 4/2012 |
| WO | 2012052765 | 4/2012 |

OTHER PUBLICATIONS

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-μW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 μA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Bionic contact lens 'to project emails before eyes,' http://www.kurzweilai.netforums/topic/bionic-contact-lens-to-project-emails-before-eyes, Last accessed Mar. 14, 2012, 2 pages.

Brahim, et al., "Polypyrrole-hydrogel composites for the construction of clinically important biosensors," 2002, Biosensors & Bioelectronics, pp. 53-59, vol. 17.

Chen, et al., "Microfabricated Implantable Parylene-Based Wireless Passive Intraocular Pressure Sensors," Journal of Microelectromechanical Systems, Dec. 2008, pp. 1342-1351, vol. 17, No. 6.

Chu, et al., "Soft Contact-lens Sensor for Monitoring Tear Sugar as Novel Wearable Device of Body Sensor Network," http://www.ksi edu/seke/dms11/DMS/2_Kohji_Mitsubayashi.pdf, Last accessed Jul. 27, 2012, 4 pages.

"Contact Lenses: Look Into My Eyes," The Economist, Jun. 2, 2011 , http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul./Aug. 2009, pp. 48-53, vol. 8, No. 7.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Huang, et al., "Wrinkling of Ultrathin Polymer Films," Mater. Res. Soc. Symp. Proc., 2006, 6 pages, vol. 924, Materials Research Society.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Liao, et al., "A 3-μW CMOS Glucose Sensor for Wireless Contact-Lens Tear Glucose Monitoring ,"IEEE Journal of Solid-State Circuits, Jan. 2012, pp. 335-344, vol. 47, No. 1.

Liao, et al., "A 3-μW Wirelessly Powered CMOS Glucose Sensor for an Active Contact Lens," 2011 IEEE International Solid-State Circuits Conference, Session 2, Feb. 21, 2011, 3 pages.

Lingley, et al., "A Single-Pixel Wireless Contact Lens Display," Journal of Micromechanics and Microengineering, 2011, pp. 1-8.

Lingley, et al., "Multipurpose integrated active contact lenses," SPIE, 2009, 2 pages.

Liu, et al., "Miniature Amperometric Self-Powered Continuous Glucose Sensor with Linear Response," Analytical Chemistry, 2012, 7 pages.

Loncar, et al., "Design and Fabrication of Silicon Photonic Crystal Optical Waveguides," Journal of Lightwave Technology, Oct. 2000, pp. 1402-1411, vol. 18, No. 10.

Murdan, "Electro-responsive drug delivery from hydrogels," Journal of Controlled Release, 2003, pp. 1-17, vol. 92.

Pandey, et al., "A Fully Integrated RF-Powered Contact Lens With a Single Element Display," IEEE Transactions on Biomedical Circuits and Systems, Dec. 2010, pp. 454-461, vol. 4, No. 6.

(56) References Cited

OTHER PUBLICATIONS

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Selner, et al., "Novel Contact Lens Electrode Array for Multi-electrode Electroretinography (meERG)," IEEE, 2011, 2 pages.

Singh, et al., "Novel Approaches in Formulation and Drug Delivery using Contact Lenses," Journal of Basic and Clinical Pharmacy, May 2011, pp. 87-101, vol. 2, Issue 2.

Thomas, et al., "Functional Contact Lenses for Remote Health Monitoring in Developing Countries," IEEE Global Humanitarian Technology Conference, 2011, pp. 212-217, IEEE Computer Society.

Tweedie, et al., "Contact creep compliance of viscoelastic materials via nanoindentation," J. Mater. Res., Jun. 2006, pp. 1576-1589, vol. 21, No. 2, Materials Research Society.

Wall, K., "Active contact lens that lets you see like the Terminator patented," Feb. 10, 2012, http://vvww.patexia.com/feed/active-contact-lens-that-lets-you-see-like-the-terminator-patented-2407, Last accessed Mar. 28, 2012, 5 pages.

Zarbin, et al., "Nanotechnology in ophthalmology," Can J Ophthalmol, 2010, pp. 457-476, vol. 45, No. 5.

\* cited by examiner

FIG. 4A  FIG. 4B

PHOTODIODE OPERABLE IN PHOTOCONDUCTIVE MODE AND PHOTOVOLTAIC MODE

BACKGROUND

Unless otherwise indicated herein, the materials described in this section are not prior art to the claims in this application and are not admitted to be prior art by inclusion in this section.

A diode typically includes a PN junction. The P-type material forms an anode, and the N-type material forms a cathode. At the junction between the two materials, electrons from the N-type material diffuse into the P-type material, and leave behind positively charged donor ions on the N-type side of the junction. Similarly, holes from the P-type material diffuse into the N-type material, and leave behind negatively charged ions on the P-type side of the junction. The electrons and holes eventually recombine in the P-type material, and N-type material, respectively, but the positive and negative charges on either side of the junction remain. The charges therefore electrically polarize the junction and create an electric field that depletes the region surrounding the junction of free charge carriers, at which point further diffusion of electrons and holes ceases. The electrical polarization also defines a potential barrier at the junction that opposes external current. But when a voltage is applied to positively charge the anode relative to the cathode, the potential barrier of the depletion region can be overcome by the external voltage and external current can flow from the anode to the cathode via recombination events in the vicinity of the depletion region.

A photodiode is a type of diode in which the depletion region is a light-sensitive region where incident photons generate electron-hole pairs via the photoelectric effect. The electrical polarization of the depletion region causes the generated electron-hole pairs to separate and diffuse in different directions. Electrons diffuse toward the accumulation of positive charge adjacent the depletion region in the N-type cathode, and holes diffuse toward the accumulation of negative charge adjacent the depletion region in the P-type anode. The internal generation and diffusion of electron-hole pairs creates a reverse photocurrent within the photodiode (from the cathode to the anode) that is linearly proportional to the flux of incident light (and thus the rate of electron-hole pair generation). When the photodiode is reverse biased (with the cathode at a greater voltage than the anode), the electrical polarization of the depletion region is reinforced by the reverse bias and the depletion region becomes larger, and more sensitive to photocurrent generation. Moreover, the externally applied reverse bias voltage provides a current sink to drain current to and a current source to draw current from and thereby allow the photodiode to output the generated reverse photocurrent. While the photodiode is reverse biased and generates a reverse photocurrent linearly proportional to the flux of incident light, the photodiode is operating in photoconductive mode.

When the photodiode is not reverse biased, such as when the anode and/or cathode is allowed to float, the photodiode does not operate in photoconductive mode. The generation of electron-hole pairs still occurs in response to incident light, but without an applied reverse bias, the light-sensitive depletion region is not as large and the electrical polarization of the depletion region is not as strong. Moreover, with one terminal of the photodiode floating, an internally generated, ongoing photocurrent from the anode/cathode is not maintained. As a result, when the photodiode is not reverse biased, the generated electron-hole pairs do not create a reverse photocurrent proportionate to the incident light. Instead, an internal reverse photocurrent is generated due to the internal polarization of the depletion region. The internal reverse photocurrent causes charge to accumulate on the cathode and the anode, with the P-type anode becoming positively charged relative to the N-type cathode. Once the anode and cathode accumulate enough charge to counter the internal potential barrier of the depletion region, the photodiode reaches its open circuit voltage, at which point the internal current ceases. The initial photocurrent before the internal current ceases leaves the anode at a greater voltage than the cathode. The value of the voltage difference between the anode and the cathode (i.e., the open circuit voltage) scales with the logarithm of the flux of incident light. While the photodiode is not reverse biased and generates a voltage proportionate to the logarithm of the flux of incident light, the photodiode is operating in photovoltaic mode.

SUMMARY

A body-mountable device equipped with a light sensor is disclosed. The light sensor includes a photodiode that operates in either a photoconductive mode or a photovoltaic mode depending on whether the photodiode is reverse biased. A group of switches are arranged to selectively couple the photodiode to first and second voltage sources to configure the photodiode to operate in either mode. A controller selects a mode of operation of the photodiode and controls the switches to cause the photodiode to respond to incident light while operating in the selected mode. The controller then obtains a measurement from the photodiode indicative of the intensity of light received during an exposure interval. The light sensor can thus include a single photodiode and yet be used to alternately obtain measurements based on the photoconductive response of the photodiode or based on the photovoltaic response of the photodiode.

Some embodiments of the present disclosure provide a device including a photodiode, a first voltage source and a second voltage source, a sampling capacitor, and a controller. The photodiode can have a light-sensitive area, an anode, and a cathode. While the photodiode is reverse biased, the photodiode can be configured to operate in a photoconductive mode, in which the photodiode generates an internal photocurrent directed from the cathode to the anode in response to light incident on the light-sensitive area. And while the photodiode is not reverse biased, the photodiode can be configured to operate in a photovoltaic mode, in which the photodiode develops a voltage between the cathode and the anode in response to light incident on the light-sensitive area. At least one of the first and second voltage sources can be coupled to one or more of the anode and the cathode of the photodiode though one or more switches. In a first configuration, the one or more switches can cause the photodiode to be reverse biased between the first and second voltage sources. And in a second configuration, the one or more switches can cause the photodiode to not be reverse biased. The sampling capacitor can be coupled to the photodiode and to an output node. The controller can be configured to operate the one or more switches and to obtain voltage measurements of the sampling capacitor, through the output node, so as to alternately: (i) configure the photodiode to operate in the photoconductive mode during a first exposure interval, and obtain, through the output node, a voltage measurement indicative of an amount of current drained through the photodiode during the first exposure interval; and (ii) configure the photodiode to operate in the photovoltaic mode during a second exposure interval, and obtain, through the output node, a voltage measurement indicative of a voltage developed across the photodiode during the second exposure interval.

Some embodiments of the present disclosure provide a method. The method can include operating one or more switches so as to apply a first voltage source and a second voltage source to a photodiode such that the photodiode is reverse biased. The photodiode can have a light-sensitive area, an anode, and a cathode. The method can include waiting, during a first exposure interval in which the photodiode is reverse biased, while the photodiode generates an internal reverse photocurrent in response to light incident on the light-sensitive area. The method can include obtaining a voltage measurement indicative of an amount of current conveyed through the photodiode during the first exposure interval. The method can include operating the one or more switches so as to not reverse bias the photodiode. The method can include waiting, during a second exposure interval in which the photodiode is not reverse biased, while the photodiode develops a voltage between the anode and a cathode of the photodiode in response to light incident on the light-sensitive. The method can include obtaining a voltage measurement indicative of the voltage developed across the photodiode during the second exposure interval.

Some embodiments of the present disclosure include a body-mountable device. The body-mountable device can include a polymeric material, a substrate, an antenna, a photodiode, a first voltage source and a second voltage source, a sampling capacitor, and a controller. The polymeric material can be formed to include a body-mountable surface. The substrate can be at least partially embedded within the polymeric material. The antenna can be disposed on the substrate. The photodiode can be disposed on the substrate. The photodiode can have a light-sensitive area, an anode, and a cathode. While the photodiode is reverse biased, the photodiode can be configured to operate in a photoconductive mode, in which the photodiode generates an internal photocurrent directed from the cathode to the anode in response to light incident on the light-sensitive area. And while the photodiode is not reverse biased, the photodiode can be configured to operate in a photovoltaic mode, in which the photodiode develops a voltage between the cathode and the anode in response to light incident on the light-sensitive area. The first voltage source and the second voltage source can be disposed on the substrate. At least one of the first and second voltage sources can be coupled to one or more of the anode and the cathode of the photodiode though one or more switches. In a first configuration, the one or more switches can cause the photodiode to be reverse biased between the first and second voltage sources. And in a second configuration, the one or more switches can cause the photodiode to not be reverse biased. The sampling capacitor can be coupled to the photodiode and to an output node. The controller can be electrically connected to the antenna. The controller can be configured to: (i) operate the one or more switches and to obtain voltage measurements of the sampling capacitor, through the output node, so as to: (a) configure the photodiode to operate in the photoconductive mode during a first exposure interval, and obtain, through the output node, a voltage measurement indicative of an amount of current drained through the photodiode during the first exposure interval; (b) configure the photodiode to operate in the photovoltaic mode during a second exposure interval, and obtain, through the output node, a voltage measurement indicative of a voltage developed across the photodiode during the second exposure interval; and (ii) use the antenna to indicate the obtained voltage measurement.

Some embodiments of the present disclosure provide means for operating one or more switches so as to apply a first voltage source and a second voltage source to a photodiode such that the photodiode is reverse biased. The photodiode can have a light-sensitive area, an anode, and a cathode. Some embodiments of the present disclosure provide means for waiting, during a first exposure interval in which the photodiode is reverse biased, while the photodiode generates an internal reverse photocurrent in response to light incident on the light-sensitive area. Some embodiments of the present disclosure provide means for obtaining a voltage measurement indicative of an amount of current conveyed through the photodiode during the first exposure interval. Some embodiments of the present disclosure provide means for operating the one or more switches so as to not reverse bias the photodiode. Some embodiments of the present disclosure provide means for waiting, during a second exposure interval in which the photodiode is not reverse biased, while the photodiode develops a voltage between the anode and a cathode of the photodiode in response to light incident on the light-sensitive. Some embodiments of the present disclosure provide means for obtaining a voltage measurement indicative of the voltage developed across the photodiode during the second exposure interval.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4A shows an example photodiode configured to operate in photoconductive mode.

FIG. 4B shows an example photodiode configured to operate in photovoltaic mode.

DETAILED DESCRIPTION

Figure 1:
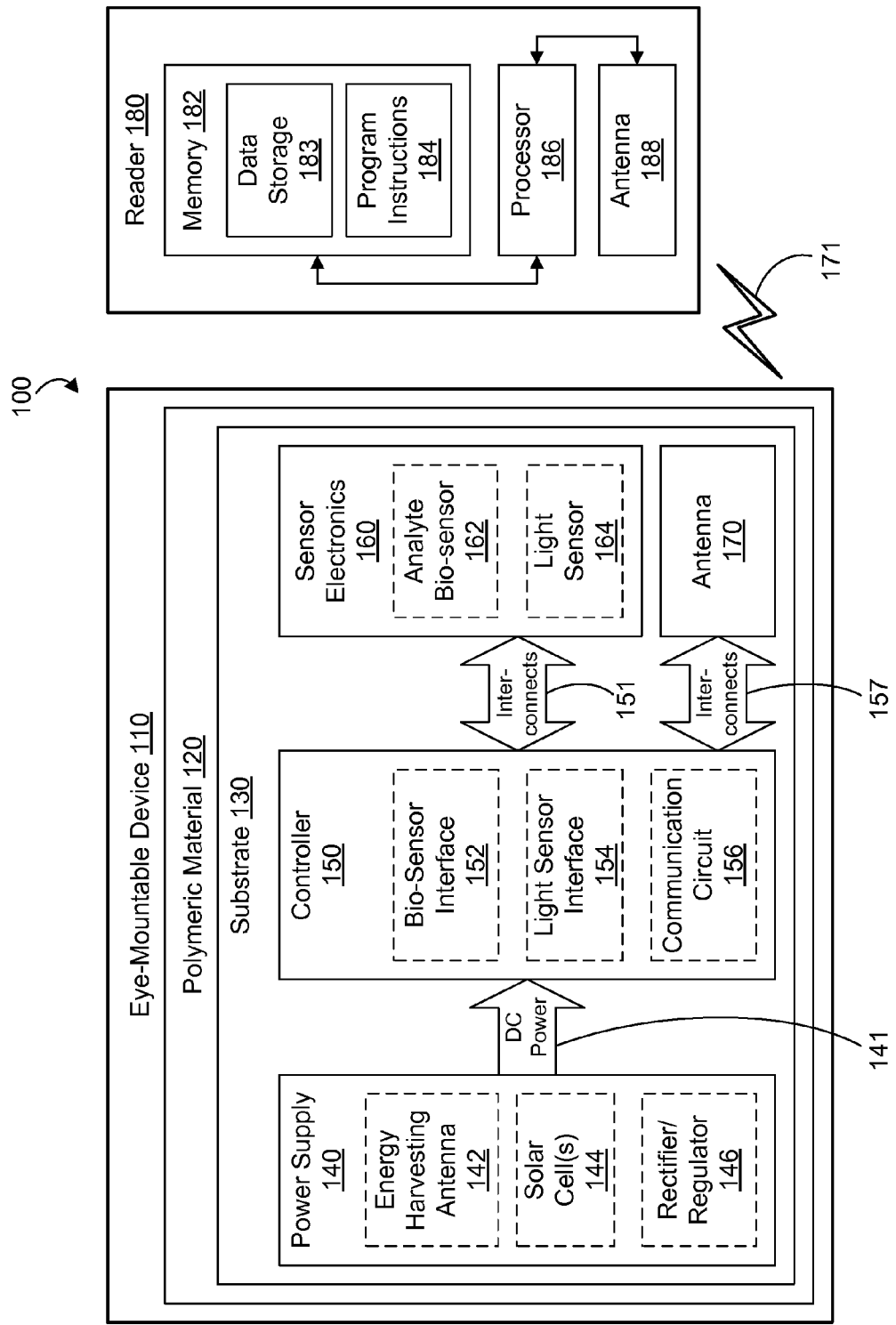
FIG. 1 is a block diagram of an example system that includes a body-mountable device in wireless communication with an external reader.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A circuit is configured to operate a photodiode alternately in photoconductive mode or in photovoltaic mode. The circuit includes a group of switches, such as transistors, that selectively connect the photodiode to voltage sources to either reverse bias the photodiode, and cause it to operate in photoconductive mode, or not reverse bias the photodiode, and cause it to operate in photovoltaic mode. The circuit also includes a measurement node from which an analog to digital converter can measure an indication of the light received by the photodiode. In photoconductive mode, the measurement node can be used to sample an indication of the reverse photocurrent, which scales linearly with the flux of incident light. In photovoltaic mode, the measurement node can be used to sample an indication of the voltage on the photodiode, which scales logarithmically with the flux of incident light.

The circuit can also include a capacitor connected to the measurement node. To provide an indication of the linearly scaling reverse photocurrent while the photodiode is in photoconductive mode, the capacitor can initially be connected in parallel with the photodiode, and a reverse bias voltage can be applied, which charges the capacitor. The bias voltage can then be disconnected, and the capacitor can discharge through the photodiode during an interval while the photodiode is exposed to incident light. The voltage remaining on the capacitor at the end of the exposure interval indicates the magnitude of the reverse photocurrent during the exposure interval. Thus, sampling the voltage of the capacitor with the analog-to-digital converter at the end of the exposure interval provides an indication of the flux of incident light. Adjusting the initially charged voltage or the exposure interval allows the photodiode to provide readings for different intensities of incident light.

To provide an indication of the logarithmically scaling open circuit voltage while the photodiode is in photovoltaic mode, the capacitor can be connected in parallel with the photodiode, and either the anode or cathode can be set to a reference voltage. During an exposure interval, the photodiode develops a voltage that is logarithmically related to the flux of incident light, and that voltage is applied across the capacitor. Sampling the capacitor voltage following an exposure interval thereby provides an indication of the flux of incident light.

A controller may then be configured to operate the various switches and/or voltage sources that switch the mode of operation of the photodiode. The controller may be programmed with logic that causes control signals to be applied to transistors that switch the photodiode between its different modes of operation. The controller may also operate the analog-to-digital converter to obtain measurements (e.g., the voltage on the sampling capacitor) following exposure intervals. The controller can also map those measurements to light intensities, perhaps in accordance with calibration information.

Such a circuit for operating a photodiode alternately in photoconductive mode and in photovoltaic mode and obtaining measurements indicative of light received in either mode may be used as an ambient light sensor, for example. By using a single photodiode that operates alternately in both modes, the space occupied by the circuit can be smaller than another light-sensing circuit that uses two separate photodiodes. Yet the two operation modes can provide an enhanced dynamic range in comparison to a typical single photodiode light-sensing circuit. In spatially constrained and/or power constrained applications, such as encountered in the context of body-mountable electronic devices, the disclosed circuit may be particularly useful as an ambient light sensor.

One such body-mountable electronic device may be an eye-mountable device formed of a polymeric material that is shaped to be contact mounted to an eye, similar to a contact lens. A substrate embedded within the polymeric material can be used to mount bio-interactive electronics and associated power and communication electronics. In one example, an antenna disposed on the substrate is used to harvest energy from incident radio frequency radiation, and the harvested energy can be used, via a rectifier voltage regulator, to power the remaining electronics. Communication electronics can be used to modulate the impedance of the energy-harvesting antenna to cause corresponding modifications of the antenna's backscatter radiation, which can then be detected by a reader.

II. Example Body-Mountable Electronics Platform

FIG. 1 is a block diagram of a system 100 that includes a body-mountable device 110 in wireless communication with an external reader 180. The exposed regions of the body-mountable device 110 are made of a polymeric material 120 formed to be contact-mounted to a corneal surface of an eye. A substrate 130 is embedded in the polymeric material 120 to provide a mounting surface for a power supply 140, a controller 150, sensor electronics 160, and a communication antenna 170. The sensor electronics 160 are operated by the controller 150. The power supply 140 supplies operating voltages to the controller 150 and/or the sensor electronics 160. The antenna 170 is operated by the controller 150 to communicate information to and/or from the body-mountable device 110. The antenna 170, the controller 150, the power supply 140, and the sensor electronics 160 can all be situated on the embedded substrate 130. Because the body-mountable device 110 includes electronics and is configured to be contact-mounted to an eye, it is also referred to herein as an ophthalmic electronics platform.

To facilitate contact-mounting, the polymeric material 120 can have a concave surface configured to adhere ("mount") to a moistened corneal surface (e.g., by capillary forces with a tear film coating the corneal surface). Additionally or alternatively, the device 110 can be adhered by a vacuum force between the corneal surface and the polymeric material 120 due to the concave curvature. While mounted with the concave surface against the eye, the outward-facing surface of the polymeric material 120 can have a convex curvature that is formed to not interfere with eye-lid motion while the body-mountable device 110 is mounted to the eye. For example, the polymeric material 120 can be a substantially transparent curved polymeric disk shaped similarly to a vision correction contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some embodiments, the polymeric material 120 can be a deformable ("non-rigid") material to enhance wearer comfort. In some embodiments, the polymeric material 120 can be shaped to provide a predetermined, vision-correcting optical power, such as can be provided by a contact lens. Moreover, the polymeric material 120 may be formed to facilitate mounting to another body surface, such as a tooth surface, ear surface, skin surface, etc., and the polymeric material 120 may have properties (e.g., flexibility, surface hardness, lubricity, etc.) selected to be suitable for such mounting locations.

The substrate 130 includes one or more surfaces suitable for mounting the sensor electronics 160, the controller 150, the power supply 140, and the antenna 170. The substrate 130 can be employed both as a mounting platform for chip-based circuitry (e.g., by flip-chip mounting to connection pads) and/or as a platform for patterning conductive materials (e.g., gold, platinum, palladium, titanium, copper, aluminum, silver, metals, other conductive materials, combinations of these, etc.) to create electrodes, interconnects, connection pads, antennae, etc. In some embodiments, substantially transparent conductive materials (e.g., indium tin oxide) can be patterned on the substrate 130 to form circuitry, electrodes, etc. For example, the antenna 170 can be formed by forming a pattern of gold or another conductive material on the substrate 130 by deposition, photolithography, electroplating, etc. Similarly, interconnects 151, 157 between the controller 150 and the sensor electronics 160, and between the controller 150 and the antenna 170, respectively, can be formed by depositing suitable patterns of conductive materials on the substrate 130. A combination of microfabrication techniques including, without limitation, the use of photoresists, masks, deposition techniques, and/or plating techniques can be employed to pattern materials on the substrate 130.

The substrate 130 can be a relatively rigid material, such as polyethylene terephthalate ("PET"), parylene, or another material configured to structurally support the circuitry and/or chip-based electronics within the polymeric material 120. The body-mountable device 110 can alternatively be arranged with a group of unconnected substrates rather than a single substrate. For example, the controller 150 and a sensor in sensor electronics 160 can be mounted to one substrate, while the antenna 170 is mounted to another substrate and the two can be electrically connected via the interconnects 157. In another example, the substrate 130 can include separate partitions that each support separated, overlapped coiled portions of the antenna 170. Such as, for example, an example in which the antenna 170 is divided into multiple windings that wrap around the body-mountable device 110 circumferentially at respective radii, and are connected in parallel and/or in series. To facilitate movement of the individual windings with respect to one another, and thereby enhance flexibility of the body-mountable device 110, and help prevent binding, etc., the individual windings may each be mounted on divided portions of the substrate 130, which may substantially correspond to the windings of such an antenna.

The substrate 130 has a width sufficient to provide a mounting platform for the embedded electronics components. The substrate 130 can have a thickness sufficiently small to allow the substrate 130 to be embedded in the polymeric material 120 without influencing the profile of the body-mountable device 110. The substrate 130 can have a thickness sufficiently large to provide structural stability suitable for supporting the electronics mounted thereon. For example, in an implementation in which the body-mountable device 110 is an eye-mountable device, the substrate 130 can be shaped as a ring with a diameter of about 10 millimeters, a radial width of about 1 millimeter (e.g., an outer radius 1 millimeter larger than an inner radius), and a thickness of about 50 micrometers. The substrate 130 can optionally be aligned with the curvature of an eye-mountable surface of the polymeric material 120 (e.g., the convex or concave surfaces). For example, the substrate 130 can be shaped along the surface of an imaginary cone between two circular segments that define an inner radius and an outer radius. In such an example, the surface of the substrate 130 along the surface of the imaginary cone defines an inclined surface that is approximately aligned with the curvature of the eye mounting surface (concave) and/or outward surface (convex) at that radius.

The power supply 140 is configured to harvest ambient energy to power the controller 150 and sensor electronics 160. For example, a radio-frequency energy-harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the external reader 180. That is, the functions of the communication antenna 170 and the energy harvesting antenna 142 can be accomplished with the same physical antenna.

A rectifier/regulator 146 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 146. The rectifier/regulator 146 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 146 can include one or more energy storage devices to mitigate high frequency variations in the ambient energy gathering antenna 142 and/or solar cell(s) 144. For example, one or more energy storage devices (e.g., a capacitor, a battery, etc.) can be connected in parallel across the outputs of the rectifier 146 to regulate the DC supply voltage 141 and configured to function as a low-pass filter.

The controller 150 can be turned on when the DC supply voltage 141 is provided to the controller 150, and the logic in the controller 150 can then operate the sensor electronics 160 and the antenna 170. The controller 150 can include logic circuitry configured to operate the sensor electronics 160 so as to sense a characteristic of the environment of the body-mountable device 110. For example, the sensor electronics 160 may include an analyte bio-sensor 162 configured to sense an analyte in the biological environment (e.g., tear film) of the body-mountable device 110. Additionally or alternatively, the sensor electronics 160 could include a light sensor 164 that is configured to detect an intensity of incident light, or perhaps an image sensor configured to capture an image from a perspective of the body-mountable device 110 (e.g., an external environment outside of the eye or an internal environment within the eye).

In one example, the controller 150 includes a bio-sensor interface module 152 that is configured to operate analyte bio-sensor 162. The analyte bio-sensor 162 can be, for example, an amperometric electrochemical sensor that includes a working electrode and a reference electrode. A voltage can be applied between the working and reference electrodes to cause an analyte to undergo an electrochemical reaction (e.g., a reduction and/or oxidation reaction) at the working electrode. The electrochemical reaction can generate an amperometric current that can be measured through the working electrode. The amperometric current can be dependent on the analyte concentration. Thus, the amount of the amperometric current that is measured through the working electrode can provide an indication of analyte concentration. In some embodiments, the bio-sensor interface module 152 can be a potentiostat configured to apply a voltage difference between working and reference electrodes while measuring a current through the working electrode.

The controller 150 can include a light sensor interface 154 for operating light sensor 164. The light sensor 164 can include one or more photo-sensitive devices, such as a photodiode. In some examples, the light sensor 164 is a circuit including a photodiode that can be configured to alternately operate in photovoltaic mode, which occurs while the photodiode is not reverse biased, or in photoconductive mode, which occurs while the photodiode is reverse biased. In photoconductive mode the photodiode conducts a reverse current that is roughly linearly related to the intensity of incident light. And in photovoltaic mode the photodiode responds to incident light by generating a voltage logarithmically related to the intensity of incident light. The photodiode can be selectively connected to various voltage sources to either reverse bias the photodiode, and thereby enable the photoconductive mode, or not reverse bias the photodiode, and thereby enable the photovoltaic mode. By combining both modes of operation, the photodiode can be sensitive to intensities of incident light with a response that is alternately logarithmic (in photovoltaic mode) or linear (in photoconductive mode).

The light sensor 164 can therefore be a dual mode ambient light sensor that outputs a signal related to either the voltage across the photodiode, while in photovoltaic mode, or the current through the photodiode, while in photoconductive mode. The light sensor interface 154 can include, for example, an analog to digital converter that is used to sample voltages from the light sensor 164 and thereby obtain data indicative of the intensity of incident light. The light sensor interface 154 may also function to regulate the mode of operation of the light sensor 164 by adjusting the voltages applied to the photodiode through operation of one or more switches.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. In some examples, the body-mountable device 110 is configured to indicate an output from a bio-sensor, light sensor, and/or image sensor by modulating an impedance of the antenna 170 in a manner that can be perceived by the external reader 180. For example, the communication circuit 156 can cause variations in the amplitude, phase, and/or frequency of backscatter radiation from the antenna 170, and such variations can be detected by the reader 180.

The controller 150 is connected to the sensor electronics 160 via interconnects 151. For example, where the controller 150 includes logic elements implemented in an integrated circuit to form the bio-sensor interface module 152 and/or light sensor interface 154, a patterned conductive material (e.g., gold, platinum, palladium, titanium, copper, aluminum, silver, metals, combinations of these, etc.) can connect a terminal on the chip to the sensor electronics 160. Similarly, the controller 150 is connected to the antenna 170 via interconnects 157.

It is noted that the block diagram shown in FIG. 1 is described in connection with functional modules for convenience in description. However, embodiments of the body-mountable device 110 can be arranged with one or more of the functional modules ("sub-systems") implemented in a single chip, integrated circuit, and/or physical component. For example, while the rectifier/regulator 146 is illustrated in the power supply block 140, the rectifier/regulator 146 can be implemented in a chip that also includes the logic elements of the controller 150 and/or other features of the embedded electronics in the body-mountable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply block 140 and controller block 150 need not be implemented as physically separated modules. Moreover, one or more of the functional modules described in FIG. 1 can be implemented by separately packaged chips electrically connected to one another.

Additionally or alternatively, the energy harvesting antenna 142 and the communication antenna 170 can be implemented with the same physical antenna. For example, a loop antenna can both harvest incident radiation for power generation and communicate information via backscatter radiation.

The external reader 180 includes an antenna 188 (or a group of multiple antennas) to send and receive wireless signals 171 to and from the body-mountable device 110. The external reader 180 also includes a computing system with a processor 186 in communication with a memory 182. The memory 182 is a non-transitory computer-readable medium that can include, without limitation, magnetic disks, optical disks, organic memory, and/or any other volatile (e.g., RAM) or non-volatile (e.g., ROM) storage system readable by the processor 186. The memory 182 can include a data storage 183 to store indications of data, such as sensor readings (e.g., from the analyte bio-sensor 162 and/or light sensor 164), program settings (e.g., to adjust behavior of the body-mountable device 110 and/or external reader 180), etc. The memory 182 can also include program instructions 184 for execution by the processor 186 to cause the external reader 180 to perform processes specified by the instructions 184. For example, the program instructions 184 can cause external reader 180 to communicate with the body-mountable device 110. The program instructions 184 can also cause the external reader 180 to provide a user interface that allows for retrieving information communicated from the body-mountable device 110 (e.g., sensor outputs from the analyte bio-sensor 162 and/or light sensor 164). The external reader 180 can also include one or more hardware components for operating the antenna 188 to send and receive the wireless signals 171 to and from the body-mountable device 110. For example, oscillators, frequency injectors, encoders, decoders, amplifiers, filters, etc. can drive the antenna 188.

The external reader 180 can be a smart phone, digital assistant, or other portable computing device with wireless connectivity sufficient to provide the wireless communication link 171. The external reader 180 can also be implemented as an antenna module that can be plugged in to a portable computing device, such as in an example where the communication link 171 operates at carrier frequencies not commonly employed in portable computing devices. In some instances, the external reader 180 is a special-purpose device configured to be worn relatively near a wearer's eye to allow the wireless communication link 171 to operate with a low power budget. For example, the external reader 180 can be integrated in a piece of jewelry such as a necklace, earing, etc. or integrated in an article of clothing or an accessory worn near the head, such as a hat, headband, a scarf, a pair of eyeglasses, etc.

In some embodiments, the system 100 can operate to non-continuously ("intermittently") supply energy to the body-mountable device 110 to power the controller 150 and sensor electronics 160. For example, radio frequency radiation 171 can be supplied to power the body-mountable device 110 long enough to operate the sensor electronics 160 and communicate an outcome of such operation. In such an example, the supplied radio frequency radiation 171 can be considered an interrogation signal from the external reader 180 to the body-mountable device 110 to request feedback (e.g., a sensor measurement). By periodically interrogating the body-mountable device 110 (e.g., by supplying radio frequency radiation 171 to temporarily turn the device on), the external reader 180 can accumulate a set of measurements (or other feedback) over time from the sensor electronics 160 without continuously powering the body-mountable device 110.

Figure 2A:
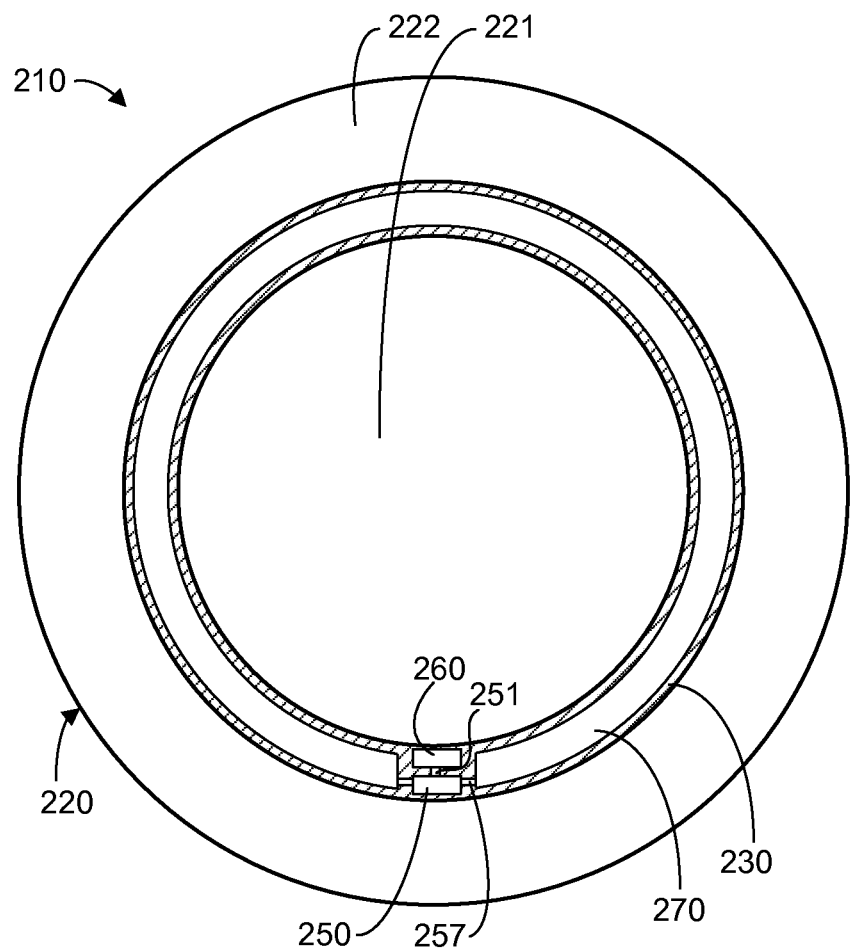
FIG. 2A is a top view of an example eye-mountable device.
Figure 2B:
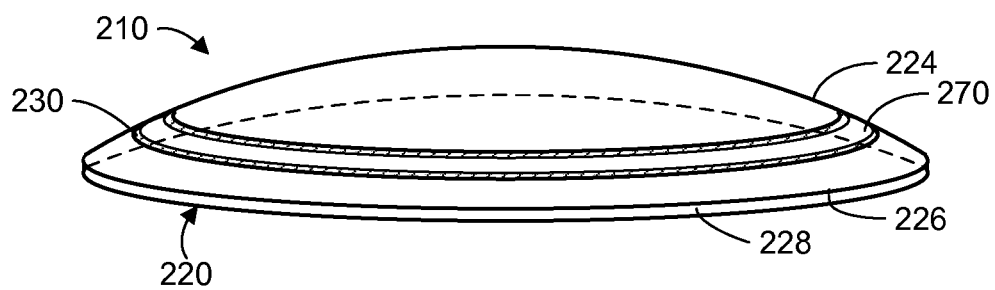
FIG. 2B is a side view of the example eye-mountable device shown in FIG. 2A.

FIG. 2A is a top view of an example eye-mountable electronic device 210 (or ophthalmic electronics platform). FIG. 2B is an aspect view of the example eye-mountable electronic device shown in FIG. 2A. It is noted that relative dimensions in FIGS. 2A and 2B are not necessarily to scale, but have been rendered for purposes of explanation only in describing the arrangement of the example eye-mountable electronic device 210. The eye-mountable device 210 is formed of a polymeric material 220 shaped as a curved disk. The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 220 can be formed with one side having a concave surface 226 suitable to fit over a corneal surface of an eye. The opposite side of the disk can have a convex surface 224 that does not interfere with eyelid motion while the eye-mountable device 210 is mounted to the eye. A circular outer side edge 228 connects the concave surface 224 and convex surface 226.

The eye-mountable device 210 can have dimensions similar to a vision correction and/or cosmetic contact lenses, such as a diameter of approximately 1 centimeter, and a thickness of about 0.1 to about 0.5 millimeters. However, the diameter and thickness values are provided for example purposes only. In some embodiments, the dimensions of the eye-mountable device 210 can be selected according to the size and/or shape of the corneal surface of the wearer's eye and/or to accommodate one or more components embedded in the polymeric material 220.

The polymeric material 220 can be formed with a curved shape in a variety of ways. For example, techniques similar to those employed to form vision-correction contact lenses, such as heat molding, injection molding, spin casting, etc. can be employed to form the polymeric material 220. While the eye-mountable device 210 is mounted in an eye, the convex surface 224 faces outward to the ambient environment while the concave surface 226 faces inward, toward the corneal surface. The convex surface 224 can therefore be considered an outer, top surface of the eye-mountable device 210 whereas the concave surface 226 can be considered an inner, bottom surface. The "top" view shown in FIG. 2A is facing the convex surface 224 From the top view shown in FIG. 2A, the outer periphery 222, near the outer circumference of the curved disk is curved to extend into the page, whereas the central region 221, near the center of the disk is curved to extend out of the page.

A substrate 230 is embedded in the polymeric material 220. The substrate 230 can be embedded to be situated along the outer periphery 222 of the polymeric material 220, away from the central region 221. The substrate 230 does not interfere with vision because it is too close to the eye to be in focus and is positioned away from the central region 221 where incident light is transmitted to the eye-sensing portions of the eye. Moreover, the substrate 230 can be formed of a transparent material to further mitigate effects on visual perception.

The substrate 230 can be shaped as a flat, circular ring (e.g., a disk with a centered hole). The flat surface of the substrate 230 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 230 can be implemented in a variety of different form factors, similar to the discussion of the substrate 130 in connection with FIG. 1 above.

A loop antenna 270, controller 250, and sensor electronics 260 are disposed on the embedded substrate 230. The controller 250 can be a chip including logic elements configured to operate the sensor electronics 260 and the loop antenna 270. The controller 250 is electrically connected to the loop antenna 270 by interconnects 257 also situated on the substrate 230. Similarly, the controller 250 is electrically connected to the sensor electronics 260 by an interconnect 251. The interconnects 251, 257, the loop antenna 270, and any conductive electrodes (e.g., for an electrochemical analyte sensor, etc.) can be formed from conductive materials patterned on the substrate 230 by a process for precisely patterning such materials, such as deposition, photolithography, etc. The conductive materials patterned on the substrate 230 can be, for example, gold, platinum, palladium, titanium, carbon, aluminum, copper, silver, silver-chloride, conductors formed from noble materials, other metals, combinations of these, etc.

The loop antenna 270 is a layer of conductive material patterned along the flat surface of the substrate to form a flat conductive ring. In some examples, to allow additional flexibility along the curvature of the polymeric material, the loop antenna 270 can include multiple substantially concentric sections electrically joined together in parallel or in series. Each section can then flex independently along the concave/convex curvature of the eye-mountable device 210. In some examples, the loop antenna 270 can be formed without making a complete loop. For instances, the antenna 270 can have a cutout to allow room for the controller 250 and sensor electronics 260, as illustrated in FIG. 2A. However, the loop antenna 270 can also be arranged as a continuous strip of conductive material that wraps entirely around the flat surface of the substrate 230 one or more times. For example, a strip of conductive material with multiple windings can be patterned on the side of the substrate 230 opposite the controller 250 and sensor electronics 260. Interconnects between the ends of such a wound antenna (e.g., the antenna leads) can then be passed through the substrate 230 to the controller 250.

When the eye-mountable device 210 is mounted over a corneal surface of an eye, the motion of the eyelids distributes a tear film that coats both the concave and convex surfaces 224, 226. The tear film is an aqueous solution secreted by the lacrimal gland to protect and lubricate the eye. The tear film layers coating the eye-mountable device 210 can be about 10 micrometers in thickness and together account for about 10 microliters. The eye-mountable device 210 may allow for electrodes to be exposed to the tear film via a channel in the polymeric material, or perhaps the polymeric material may be configured to allow for diffusion of tear film analytes to such sensor electrodes. For example, the sensor electronics 260 may include one or more sensor electrodes of an amperometric analyte sensor, and a channel in the outward-facing convex surface 224 may expose the sensor electrodes to a layer of tear fluid coating the convex surface 224. The sensor electronics can then obtain an indication of an analyte concentration in the tear film by applying a voltage to the sensor electrodes and measuring a current through one or both of the sensor electrodes. A suitable reagent can be fixed in the vicinity of the sensor electrodes to facilitate an electrochemical reaction with a desired analyte. As the analyte is consumed by such electrochemical reactions, additional analyte diffuses to the sensor, and the rate of re-supply (i.e., the rate at which the analyte diffuses to the sensor) is related to the analyte concentration. The measured amperometric current, which is related to the electrochemical reaction rate, is therefore indicative of the analyte concentration in the tear film.

III. Example Ophthalmic Ambient Light Sensor

Figure 3:
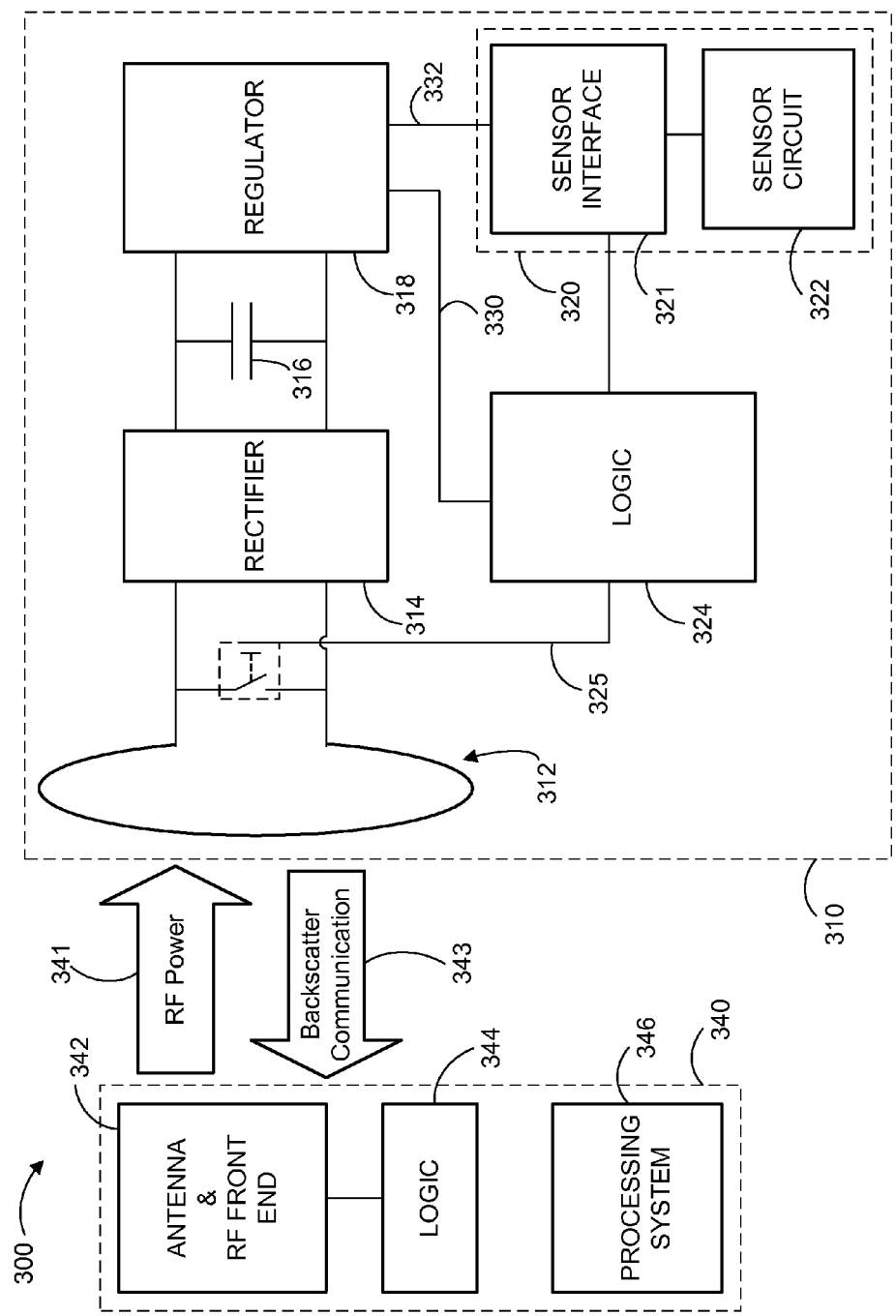
FIG. 3 is a functional block diagram of an example system configured to detect an ambient light intensity.

FIG. 3 is a functional block diagram of an example system 300 configured to detect an ambient light intensity. The system 300 includes an eye-mountable device 310 with embedded electronic components and an external reader 340. The eye-mountable device 310 includes an antenna 312 for capturing radio frequency radiation 341 from the external reader 340. The eye-mountable device 310 includes a rectifier 314, an energy storage 316, and regulator 318 for generating power supply voltages 330, 332 to operate the embedded electronics. The eye-mountable device 310 includes an ambient light sensor 320 with a sensor circuit 322 driven by a sensor interface 321. The eye-mountable device 310 includes hardware logic 324 for communicating results from the light sensor 320 to the external reader 340 by modulating the impedance of the antenna 312. An impedance modulator 325 (shown symbolically as a switch in FIG. 3) can be used to modulate the antenna impedance according to instructions from the hardware logic 324.

Similar to the body-mountable device 110 and the eye-mountable device 210 discussed above in connection with FIGS. 1 and 2, the eye-mountable device 310 can include a mounting substrate embedded within a polymeric material configured to be mounted to an eye. The light sensor 320 can be situated on a mounting surface of such a substrate (e.g., corresponding to the sensor electronics 260 on the outward-facing side of the substrate 230) to measure an intensity of light incident on the eye from the surrounding environment. The light sensor 320 can thereby be used to calibrate and/or adjust other sub-systems based on the ambient light intensity. For example, the ambient light intensity may be used to calibrate an imaging system that is arranged to obtain images corresponding to a field of view of the eye, or perhaps an image of the eye (e.g., from light reflected by the eye).

With reference to FIG. 3, the light sensor 320 measures incident light intensity using a photodiode exposed to incident light. The sensor interface 321 may read out values corresponding to the amount of light received by the photodiode. The sensor interface 321 may also be used to adjust the mode of operation of the photodiode by applying particular voltages to the photodiode. The sensor circuit 322 includes the photodiode and an arrangement of switches that facilitate selectively reverse biasing the photodiode. The photodiode functions in different modes, and provides different responses to incident light, depending on the voltage applied to the photodiode. When reverse biased, the photodiode operates in photoconductive mode and generates a current that is approximately linearly proportionate to the intensity of incident light. But when not reverse biased, the photodiode operates in photovoltaic mode and develops a voltage that is proportionate to the logarithm of incident light. The sensor interface 321 can function to both operate the switches to select the mode of operation of the photodiode, and also obtain a measurement indicative of the incident light intensity.

The rectifier 314, energy storage 316, and voltage regulator 318 operate to harvest energy from received radio frequency radiation 341. The radio frequency radiation 341 inductively generates radio frequency electrical signals on leads of the antenna 312. The rectifier 314 is connected to the antenna leads and converts the radio frequency electrical signals to a DC voltage. The energy storage 316 (e.g., capacitor) is connected across the output of the rectifier 314 to filter out high frequency components of the DC voltage. The regulator 318 receives the filtered DC voltage and outputs a digital supply voltage 330 to operate the hardware logic 324. The digital supply voltage 330 can be a voltage suitable for driving digital logic circuitry, such as approximately 1.2 volts, approximately 3 volts, etc. Reception of the radio frequency radiation 341 from the external reader 340 (or another source, such as ambient radiation, etc.) thus causes the supply voltage 330 to be supplied to the hardware logic 324 and thereby turns on the electronic components of the eye-mountable device 310. The supply voltage 330 can also power the light sensor 320 (e.g., by providing voltages to bias the photodiode, etc.), via the supply voltage 332. Application of the supply voltage 332 may cause the photodiode in the sensor circuit 322 to begin responding to incident light in a desired manner (e.g., in photovoltaic mode or in photoconductive mode). While powered, the light sensor 320 and hardware logic 324 are configured to operate in coordination so as to obtain a measurement of the intensity of light incident on the sensor circuit 322.

In some cases, the sensor results can be communicated back to the external reader 340 via backscatter radiation 343 from the antenna 312. The hardware logic 324 receives an indication of ambient light intensity from the light sensor 320 and modulates (325) the impedance of the antenna 312 in accordance with the measurement obtained by the image sensor 320. The antenna impedance and/or change in antenna impedance is detected by the external reader 340 via the backscatter signal 343. The external reader 340 can include an antenna front end 342 and logic components 344 to decode the information indicated by the backscatter signal 343 and provide digital inputs to a processing system 346. Moreover, in some cases, the measurements obtained with the light sensor may be used to calibrate/adjust operations on the eye-mountable device 310. For instance, an ambient light intensity measured by the light sensor 320 may be used to adjust an integration time for an imaging system also included in the eye-mountable device 310.

In some embodiments, one or more of the features shown as separate functional blocks can be implemented ("packaged") on a single chip. For example, the eye-mountable device 310 can be implemented with the rectifier 314, energy storage 316, voltage regulator 318, sensor interface 321, sensor circuit 322, and the hardware logic 324 packaged together in a single chip or controller module. Such a controller can have interconnects ("leads") connected to the loop antenna 312.

IV. Photodiode Modes of Operation

FIG. 4A shows an example photodiode 410 configured to operate in photoconductive mode. As shown in FIG. 4A, a reverse bias voltage 412 is applied across the photodiode 410 such that the cathode has a higher voltage than the anode. As noted above, the reverse bias voltage effects the photodiode 410 by increasing the sensitivity of the light-sensitive depletion region to incident light, and electron-hole pairs generated by incident light are more readily translated into a reverse photocurrent, roughly in proportion to the flux of incident light. In FIG. 4A, the direction of the reverse photocurrent through the photodiode while in photoconductive mode is indicated by the arrow labeled i. The reverse photocurrent is approximately linearly proportional to the flux of the incident light while the photodiode is in photoconductive mode. FIG. 4B shows the example photodiode 410 configured to operate in photovoltaic mode. In photovoltaic mode, the photodiode 410 is not reverse biased. Instead, the photodiode 410 may be allowed to float to a voltage developed in response to the flux of incident light. The voltage developed across the photodiode 410 results in the anode having a higher voltage than the cathode, as illustrated in FIG. 4B. As noted above, the voltage developed across the photodiode 410 while in photovoltaic mode is proportionate to the logarithm of the flux of incident light.

Figure 4C:
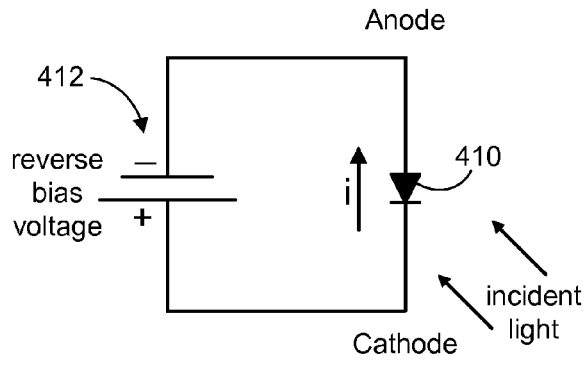
FIG. 4C is a chart of current versus voltage for an example photodiode for different intensities of incident light.
Figure 4C:
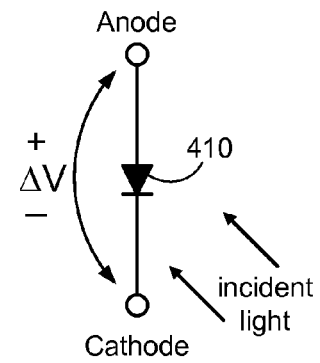
Figure 4C:
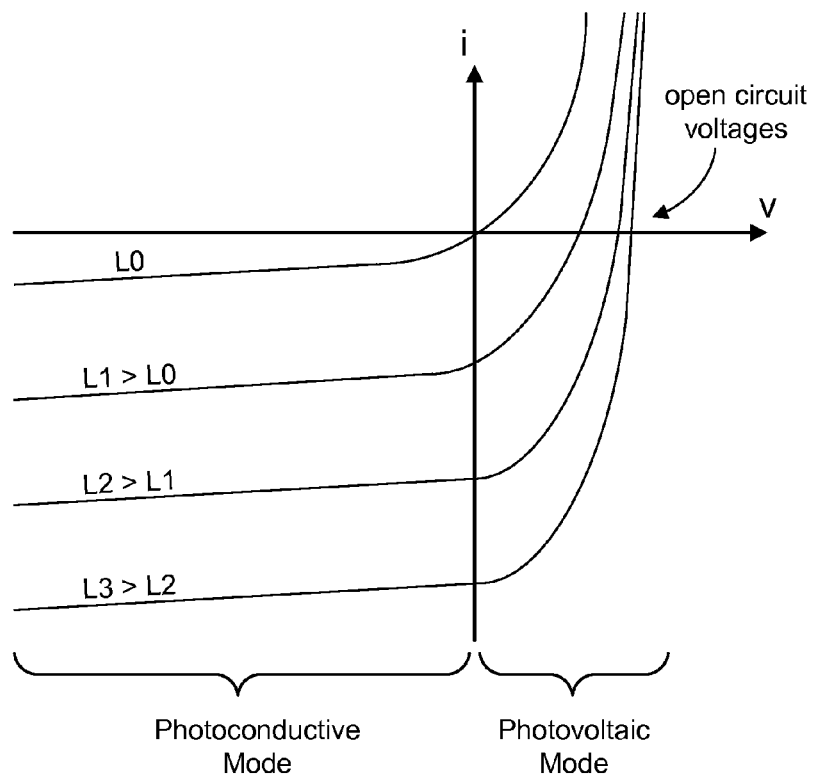

FIG. 4C is a chart of current versus voltage for an example photodiode for different intensities of incident light. Negative voltage values, which are the left of the vertical current axis, indicate reverse bias voltages (e.g., cathode voltage greater than the anode voltage). Negative current values, which are below the horizontal voltage axis, indicate reverse currents (e.g., photocurrents that flow from cathode to anode). The trend lines on the chart show current-voltage relationships for different fluxes of incident light, and are labeled L0, L1, L2, and L3. The line labeled L0 may correspond to zero incoming light, and the remaining trend lines can correspond to increasing fluxes of incident light. In particular, L3 can be a greater flux than L2, which can be greater than L1.

Referring to the trend lines L0-L3, for a given intensity of incident light, a greater magnitude of reverse bias voltage (i.e., more negative voltage) results in a greater magnitude of reverse photocurrent (i.e., more negative current). This occurs because greater reverse bias voltages increase the size of the depletion region and therefore the sensitivity of the photodiode to generation of a reverse photocurrent. This effect is illustrated by the slope in each of the trend lines L0-L3. At sufficiently negative voltages, such as beyond a breakdown voltage, the linear relationship may no longer apply, but those effects are not illustrated by the voltage range shown in FIG. 4C. There is also a linear relationship between the flux of incident light and the magnitude of the reverse photocurrent, which is represented in FIG. 4C. In particular, for a given reverse bias voltage, the magnitude of the reverse photocurrent increases linearly with increasing light flux. Thus, for a given reverse bias voltage value, the L3 trend line is at a more negative current value than the L2 trend line, which is more negative than the L1 trend line, etc. As noted above, while in photoconductive mode, the magnitude of the reverse photocurrent is approximately linearly proportionate to the flux of incident light.

The zero current intercepts of each of the trend lines L0-L3 define the open circuit voltage for the respective light intensities. The open circuit voltage is the voltage at which current ceases to flow through the device in the absence of an externally applied voltage. Again, in photovoltaic mode, the voltage developed across the photodiode due to photoelectric generation of charge carriers in the light-sensitive region is proportionate to the logarithm of the flux of incident light, and so the different trend lines have different open circuit voltages. The open circuit voltage of L3 is greater than the open circuit voltage of L2, which is greater than the open circuit voltage of L1, etc. Thus, a greater flux of incident light results in a greater developed voltage across the photodiode. However, as shown in FIG. 4C, the relative increase in the open circuit voltages among the trend lines L0-L3 do not scale at the same rate as the reverse photocurrents of those trend lines.

V. Example Dual-Mode Photodiode Circuits

A variety of different circuits may be used to selectively connect a photodiode to different voltage sources to place the photodiode in photoconductive mode and photovoltaic mode, and then obtain measurements indicative of the intensity of incident light in either mode. Examples of such circuits are illustrated in FIGS. 5A-5E. Other arrangements are also possible. The example light-sensor circuits may be included in any of the body-mountable device described above. For example, the sensor circuit 322 described in connection with the system 300 in FIG. 3 may be implemented using one of the example circuits described below, or a variation thereof.

In some cases, the circuits described below may be mounted on a substrate embedded within an implantable and/or body-mountable polymeric material. Such circuits may be, for example, wholly or partially incorporated within an integrated circuit (e.g., a chip) in such implantable and/or body-mountable devices. The example light-sensor circuits may be used to measure the intensity of ambient light and such information can be used in a number of different ways. For example, an ambient light measurement may be used to adjust the integration time of an imaging system included on the device, or to determine whether to turn on a photovoltaic energy harvesting system, among other possibilities.

Figure 5A:
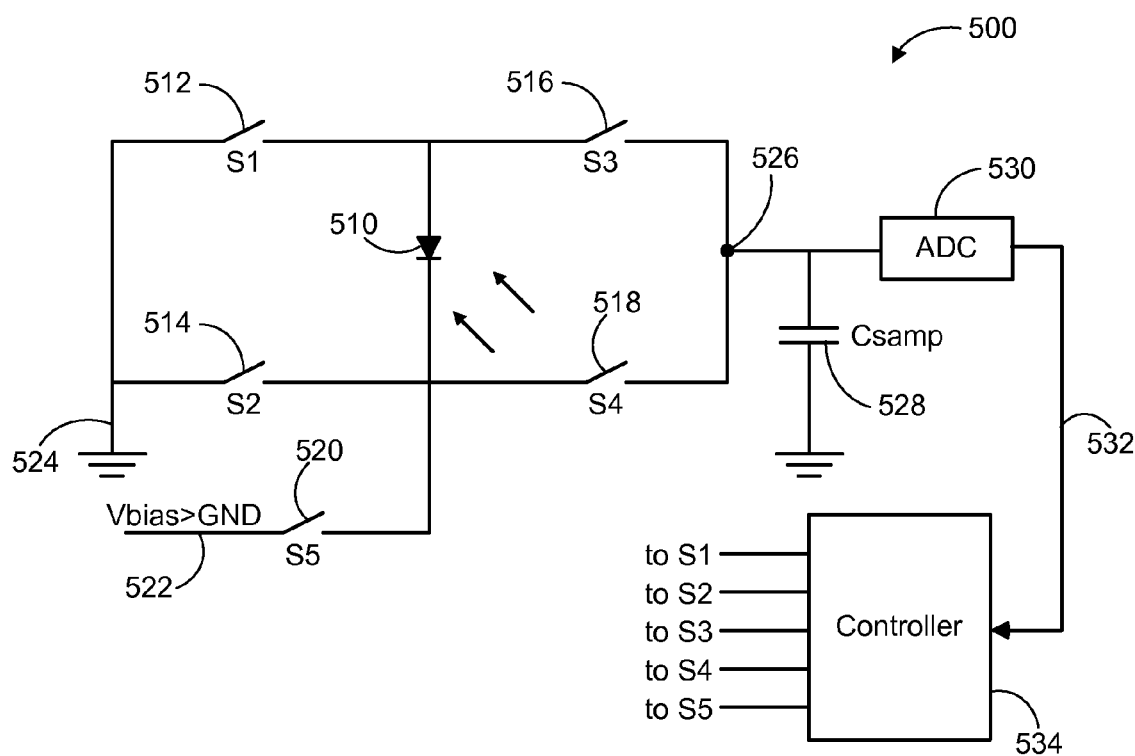
FIG. 5A is an example circuit configured to operate a photodiode in either photoconductive mode or photovoltaic mode.

FIG. 5A is an example circuit 500 configured to operate a photodiode 510 in either photoconductive mode or photovoltaic mode. In addition to the photodiode 510, the circuit 500 includes an arrangement of five switches 512, 514, 516, 518, and 518 (labeled S1-S5) to selectively apply different voltages across the photodiode 510 and thereby cause the photodiode 510 to operate in either photoconductive mode or photovoltaic mode. The voltages applied to the photodiode 510 are selected to be sufficient to operate the photodiode 510 in photoconductive mode (i.e., sufficient to reverse bias the photodiode 510). One of the voltage sources may be a ground voltage 524, as illustrated in FIG. 5A, and the other may be a bias voltage source 522 (labeled Vbias), which is greater than the ground voltage. The ground voltage 524 connects to the anode of the photodiode 510 via S1 512, and the ground voltage 524 connects to the cathode of the photodiode 510 via S2 514. The bias voltage 522 connects to the cathode of the photodiode 510 via S5 520. Thus, to set the photodiode 510 in photoconductive mode, S1 512 and S5 520 can both be closed while S2 514 is open, which reverse biases the photodiode 510 by applying the ground voltage 524 to the anode and the bias voltage 522 to the cathode. And to set the photodiode 510 in photovoltaic mode, S2 514 can be closed while S1 512 and S5 520 are opened, which allows the anode of the photodiode 510 to float while referencing the cathode to the ground voltage 524.

The circuit 500 also includes a measurement node 526 that can connect to either the anode, via S3 516, or the cathode, via S4 518. Depending on the mode of operation of the photodiode 510, the voltage and/or current measured through the measurement node 526 may be indicative of the intensity of light received by the photodiode 510. The measurement node 526 may by coupled to an analog-to-digital converter 530, which can then be used to sample voltages at the measurement node 526. Moreover, current at the measurement node 526 may be input to a transimpedance amplifier to thereby generate a voltage indicative of the current, which can then be measured with the analog-to-digital converter 530. The measurement node 526 can also be connected to a sampling capacitor 528 (labeled Csamp), or perhaps the analog-to-digital converter 530 may have an internal capacitance, and so the analog-to-digital converter 530 may sample the voltage charged on the sampling capacitor 528. The terminal of the sampling capacitor 528 not connected to the measurement node 526 is connected to a ground voltage (e.g., similar to the ground voltage 524) to reference the sampling capacitor 528. In some examples, the sampling capacitor 528 may instead be referenced to another voltage known to the analog-to-digital converter 530. Although connecting the sampling capacitor 528 to one of the voltages also connected to the photodiode 510 (e.g., ground) may allow the photodiode 510 to be connected in parallel across the sampling capacitor 528 in some cases (e.g., by closing S2 and S3), such that the voltage across the photodiode 510 is also charged on the sampling capacitor 528.

A controller 534 operates the switches S1-S5 by control lines and thereby adjusts the mode of operation of the photodiode 510 between photoconductive mode and photovoltaic mode. In practice, the controller 534 may be configured to select between a mode of operation of the circuit 500. For example, based on a previously obtained measurement, the controller 500 may determine whether to configure the circuit 500 for operation in photoconductive mode or in photovoltaic mode. Additionally or alternatively, the controller 500 may receive information from an external system (e.g., an external reader).

The switches S1-S5 may be implemented as transistors, for example, or as other devices that transition between a conductive state and a non-conductive state in accordance with instructions. In some examples, the switches S1-S5 may be field-effect transistors that are turned on and off by voltages applied to each of their gate terminals. By manipulating the switches S1-S5, the circuit 500 can be adjusted to operate the photodiode in a selected mode, and then a measurement can be obtained through the sampling node 526 to indicate the intensity of light received while in the selected mode.

Figure 5B:
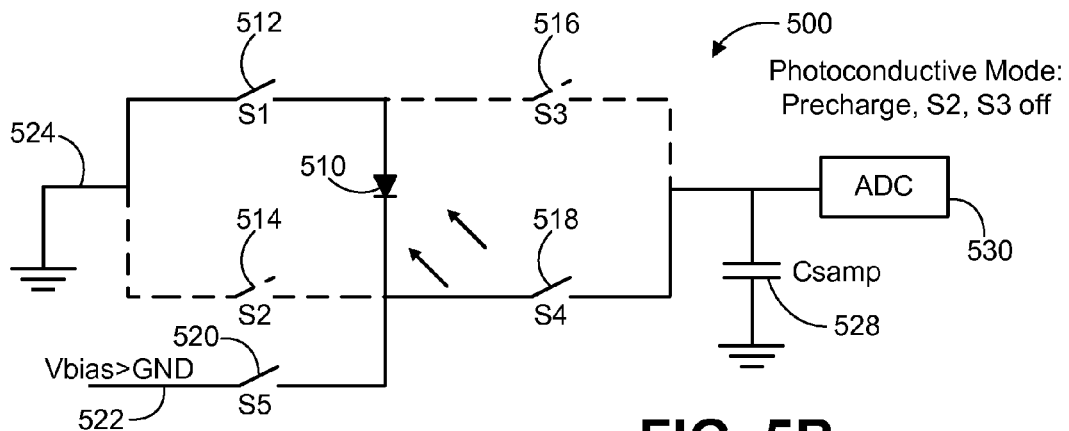
FIG. 5B illustrates the circuit shown in FIG. 5A in photoconductive mode during a precharge operation.
Figure 5C:
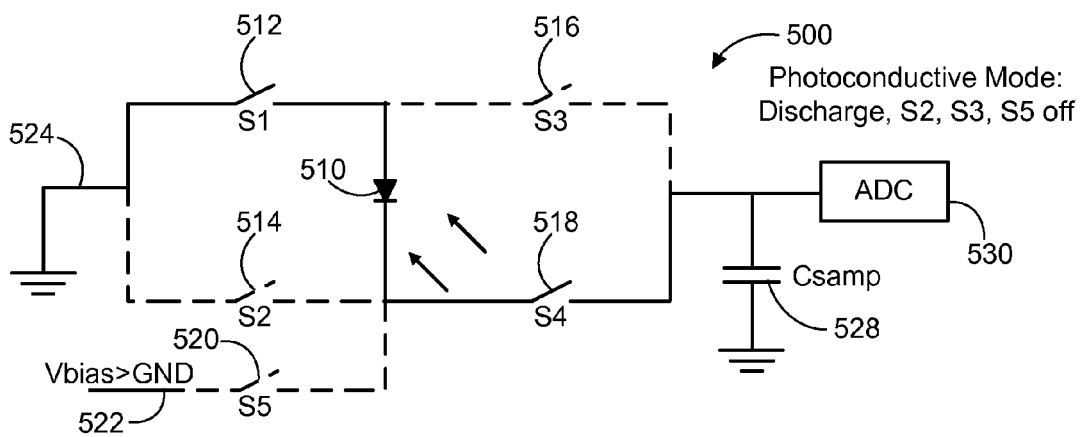
FIG. 5C illustrates the circuit shown in FIG. 5A in photoconductive mode during a discharge operation.
Figure 5D:
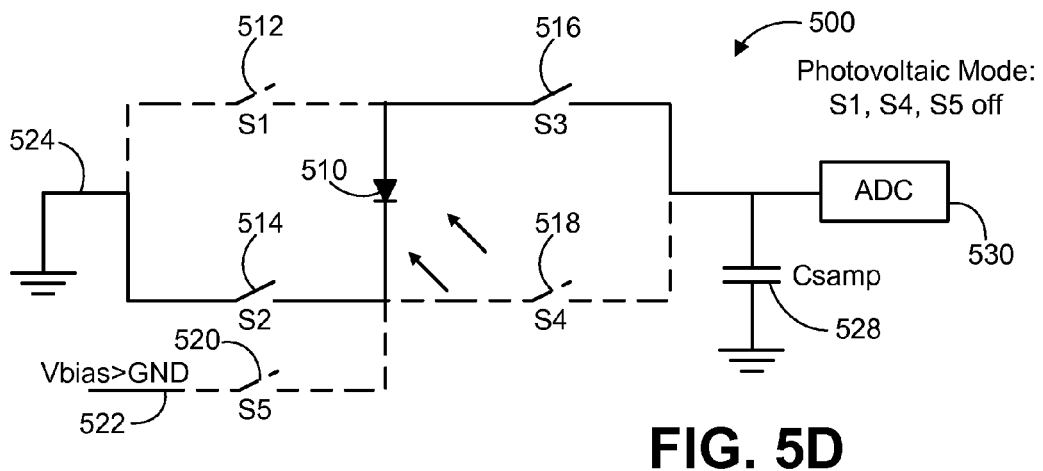
FIG. 5D illustrates the circuit shown in FIG. 5A in photovoltaic mode.

FIGS. 5B-5C illustrate an example technique for obtaining a measurement in photoconductive mode, and FIG. 5D illustrates an example of obtaining a measurement in photovoltaic mode. To facilitate understanding, the illustrations of FIGS. 5B-5D use dashed lines to indicate switches that are open, and also current paths that are inactive due to the open switches. Similarly, solid lines indicate switches that are closed and current paths that are active.

FIG. 5B illustrates the circuit 500 shown in FIG. 5A in photoconductive mode during a precharge operation. During pre-charge, the photodiode 510 is reverse biased by the bias voltage 522, and the sampling capacitor 528 is connected in parallel with the photodiode 510 to also be charged by the bias voltage 522. In practice, the photodiode 510 is reverse biased by closing S1 512, S4 528, and S5 520 and also opening S2 514 and S3 516. As a result, the ground voltage 524 is applied to the anode of the photodiode 510 through S1 512, and the bias voltage 522 is applied to the cathode through S5 520. At the same time, the sampling capacitor 528 is charged to the bias voltage 522 through S5 520 and S4 518. The bias voltage 524 is applied long enough for the voltage charged on the sampling capacitor 528 to reach the bias voltage 522. Once the sampling capacitor 528 is charged in accordance with the bias voltage 522, the bias voltage 522 can be disconnected from the photodiode 510 and the voltage applied by the sampling capacitor 528 can continue to operate the photodiode 510 in photoconductive mode.

FIG. 5C illustrates the circuit 500 shown in FIG. 5A in photoconductive mode during a discharge operation. Following the pre-charge operation (FIG. 5A), the bias voltage 522 is disconnected by opening S5 520, and the photodiode 510 discharges the sampling capacitor 528 by its reverse photocurrent. Thus, the discharge operation is initiated following the pre-charge operation by opening S5 520, and keeping S1 512 and S4 518 closed and also keeping S2 514 and S3 516 open. The photodiode 510 continues to operate in photoconductive mode due to the reverse bias voltage applied by the pre-charged sampling capacitor 528, and so the photodiode 510 conveys a reverse photocurrent with a magnitude proportionate to the intensity of incident light. The reverse photocurrent discharges the sampling capacitor 528, which decreases the voltage on the sampling capacitor 528 at a rate proportionate to the intensity of incident light. The discharge operation continues during an integration time, and then the voltage of the sampling capacitor 528 is measured using the analog-to-digital converter 530. The voltage measurement therefore provides an indication of the magnitude of the reverse photocurrent during the integration time (and thus the intensity of the incident light). In some examples, the discharge operation is stopped by opening S4 518, at which point the voltage remaining on the sampling capacitor 528 can be measured. Although in some examples, the voltage on the sampling capacitor 528 may be measured following an integration time isolating the sampling capacitor 528 by opening S4 518.

The measured voltage can be associated with an intensity of the incident light during the integration time. The association between the measured voltage and light intensity can be performed based on information including the duration of the integration time and perhaps calibration information for the particular current-voltage relationship of the photodiode 510. In practice, the association may be performed based on a mapping using a look-up table or the like, or using a number of different processes performed in the controller 534 and/or another processing system.

In addition, the duration of the integration time can be selected based on a maximum expected intensity of incident light. For example, the integration time may be too short to completely discharge the sampling capacitor 528 given the maximum expected intensity. Moreover, the duration of the integration time may be selected so as to provide sensitivity at a particular range of expected light intensity, or may be adjusted dynamically based on a previously obtained measurement of the sampling capacitor 528. For example, following a measurement in which the voltage on the sampling capacitor 528 is below a threshold value (e.g., near the ground voltage), the duration of the integration time can be decreased for a subsequent measurement, which allows less time for the sampling capacitor 528 to discharge before measuring the voltage and thereby increases the sensitivity of the measurement at higher intensities. Similarly, following a measurement in which the voltage on the sampling capacitor 528 exceeds a threshold voltage (e.g., near the bias voltage), the duration of the integration time can be increased for a subsequent measurement, which allows more time for the sampling capacitor 528 to discharge before measuring and thereby increases the sensitivity of the measurement at lower intensities.

FIG. 5D illustrates the circuit 500 shown in FIG. 5A in photovoltaic mode. During photovoltaic mode operation, the photodiode 510 is not reverse biased and the cathode of the photodiode 510 is connected to the ground voltage 524 via S2 514. The sampling capacitor 528 is connected across the photodiode 510 through S3 516 that connects the anode of the photodiode 510 to the sampling capacitor 528. As a result, the sampling capacitor 528, which is also reference to ground, becomes charged with the same voltage that develops across the photodiode 510 in response to the intensity of incident light. In practice, the photovoltaic configuration involves closing S2 514 and S3 516, and also opening S1 512, S4 518, and S5 520. While configured in photovoltaic mode, the anode of the photodiode 510 becomes positively charged relative to the cathode, and the voltage across the photodiode 510 is related to the logarithm of the intensity of incident light.

The voltage on the sampling capacitor 528 can be measured following an integration time using the analog-to-digital converter 530 or another voltage sensor. The measured voltage can then be associated with an intensity of incident light. The association between measured voltage and light intensity may be performed in a manner similar in some respects to the association performed for photoconductive mode measurements (e.g., using controller 534 and/or another processing system), although the association of photoconductive mode measurements is performed in accordance with the logarithmic relationship between voltage and intensity, rather than the approximately linear relationship between voltage and intensity. In addition, the duration of the integration time before measurements are made may be selected based on an expected light intensity or perhaps based on a previously obtained measurement. At a given light intensity, given a sufficient amount of time, the voltage developed across the photodiode (and the sampling capacitor 528) will be the open circuit voltage for that light intensity. As described in connection with FIG. 4C, the open circuit voltage is the voltage at which incident light ceases to convey current from the photodiode 510. If shorter integration times are used, the measured voltage (e.g., the voltage on the sampling capacitor 528) may not reach the open circuit voltages, but the measured voltage is still related to the intensity of incident light by a generally logarithmic relationship.

Figure 5E:
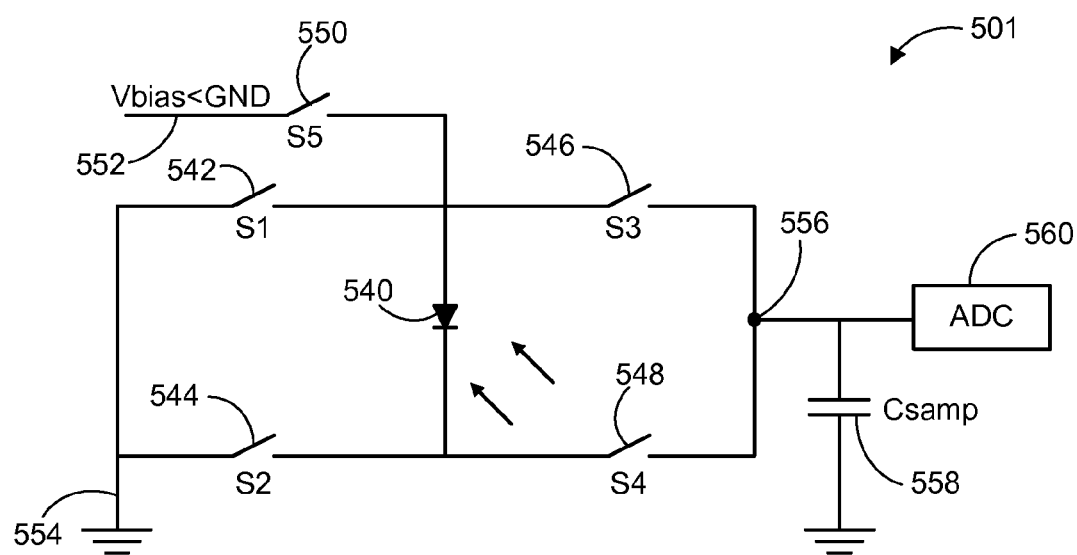
FIG. 5E is another example circuit configured to operate a photodiode in either photoconductive mode or photovoltaic mode.

FIG. 5E is another example circuit 501 configured to operate a photodiode 540 in either photoconductive mode or photovoltaic mode. In addition to the photodiode 540, the circuit 501 includes an arrangement of five switches 542, 544, 546, 548, and 550 (labeled S1-S5) to selectively apply different voltages across the photodiode 540 and thereby cause the photodiode 540 to operate in either photoconductive mode or photovoltaic mode. The voltages applied to the photodiode 540 are selected to be sufficient to operate the photodiode 540 in photoconductive mode (i.e., sufficient to reverse bias the photodiode 540). One of the voltage sources may be a ground voltage 554, as illustrated in FIG. 5A, and the other may be a bias voltage source 552 (labeled Vbias), which is less than the ground voltage. The ground voltage 554 connects to the anode of the photodiode 540 via S1 542, and the ground voltage 554 connects to the cathode of the photodiode 510 via S2 544. The bias voltage 552 connects to the anode of the photodiode 510 via S5 550. Thus, to set the photodiode 540 in photoconductive mode, S2 544 and S5 550 can both be closed while S1 542 is open, which reverse biases the photodiode 540 by applying the ground voltage 554 to the cathode and the bias voltage 552 to the anode. And to set the photodiode 540 in photovoltaic mode, S2 544 can be closed while S1 542 and S5 550 are opened, which allows the anode of the photodiode 540 to float while referencing the cathode to the ground voltage 554.

The circuit 501 also includes a sampling node 556 that is used to obtain measurements indicative of the intensity of light received at the photodiode 540. The sampling node 556 can be coupled to the anode of the photodiode 540 through S3 546. And the sampling node 556 can be coupled to the cathode of the photodiode 540 through S4 548. Similar to the sampling node 526 described above in connection with FIG. 5A, the sampling node 556 is connected to a sampling capacitor 558 and an analog-to-digital converter 560 (or another voltage sensor).

The circuit 501 can be operated to obtain a measurement in photoconductive mode by first pre-charging the sampling capacitor 558 using the bias voltage source 552, allowing the sampling capacitor 558 to partially discharge through the photodiode 540, and then measuring the voltage remaining on the sampling capacitor 558. The pre-charge operation may be initiated by closing S2 544, S3 546, and S5 550, and also opening S1 542 and S4 548. As a result, the anode of the photodiode 540 is connected to the bias voltage 552 through S5 550, and the cathode is connected to the ground voltage 554 through S2 544. And the sampling capacitor 558 is charged according to the bias voltage 552 through S5 550 and S3 546. Once charged, the discharge operation can be initiated by opening S5 550, which discharges the sampling capacitor 558 by an amount based on the magnitude of the reverse photocurrent conveyed by the photodiode 540, and the photocurrent in turn is based on the intensity of incident light. The discharge operation continues for an integration time and then the voltage remaining on the sampling capacitor 558 can be measured (e.g., using the analog-to-digital converter 560).

The circuit 501 may also be operated to obtain a measurement in photovoltaic mode by connecting the anode or cathode of the photodiode 540 to a reference voltage, waiting for a voltage to develop across the photodiode 540, and then measuring the resulting voltage. For example, the cathode of the photodiode 540 can be connected to the ground voltage 554 by closing S2 544, and the anode can be allowed to float by opening S1 542 and S5 550. The measurement node 556 (and the sampling capacitor 558) can be connected to the anode by closing S3 546 and opening S4 548. Although, in some examples, the anode may be referenced to ground by closing S1 542 and opening S2 544, and the measurement node 556 may instead by connected to the floating cathode by closing S4 548 and opening S3 546.

In contrast to the example circuit 500 described in connection with FIG. 5A, the circuit 501 includes a bias voltage source 552 with a voltage less than ground, and so reverse biasing the photodiode 540 using the ground voltage 554 involves connecting the bias voltage 552 to the anode of the photodiode 540, rather than the cathode. Generally, circuits configured to cause a photodiode to operate in either photoconductive mode or photovoltaic mode are arranged to selectively connect the photodiode's anode and cathode to different voltage sources so as to reverse bias the photodiode (and thereby cause the photodiode to operate in photoconductive mode). Such circuits are also arranged to reference either the anode or cathode to one of the voltage sources while the voltage of the other is allowed to float for measurement (and thereby cause the photodiode to operate in photovoltaic mode).

In some examples, the circuits 500 or 501 may be implemented by using transistors as the switches S1-S5. Each of the transistors may be controlled by a respective control line from the controller (e.g., the controller 534). The controller can turn individual transistors on and off by setting the voltages on the control lines. For example, a control line may be connected to a gate terminal of a given transistor, and the voltage of the control line can be adjusted to different levels to turn on the transistor (i.e., cause the transistor be conductive) or turn off the transistor (i.e., cause the transistor be non-conductive). The arrangement of transistors can then be used to selectively couple the photodiode to one or more voltage sources. In one configuration of the transistors, the photodiode can be reverse biased, and therefore operate in photoconductive mode. In another configuration of the transistors, the photodiode can be not reverse biased, and therefore operate in photovoltaic mode. The transistors can also selectively couple the photodiode to a measurement node to allow for measurements to be obtained following an exposure interval. And the obtained measurements can be indicative of the response to incident light by the photodiode while operating in a given mode, as described above.

VI. Example Operations

Figure 6A:
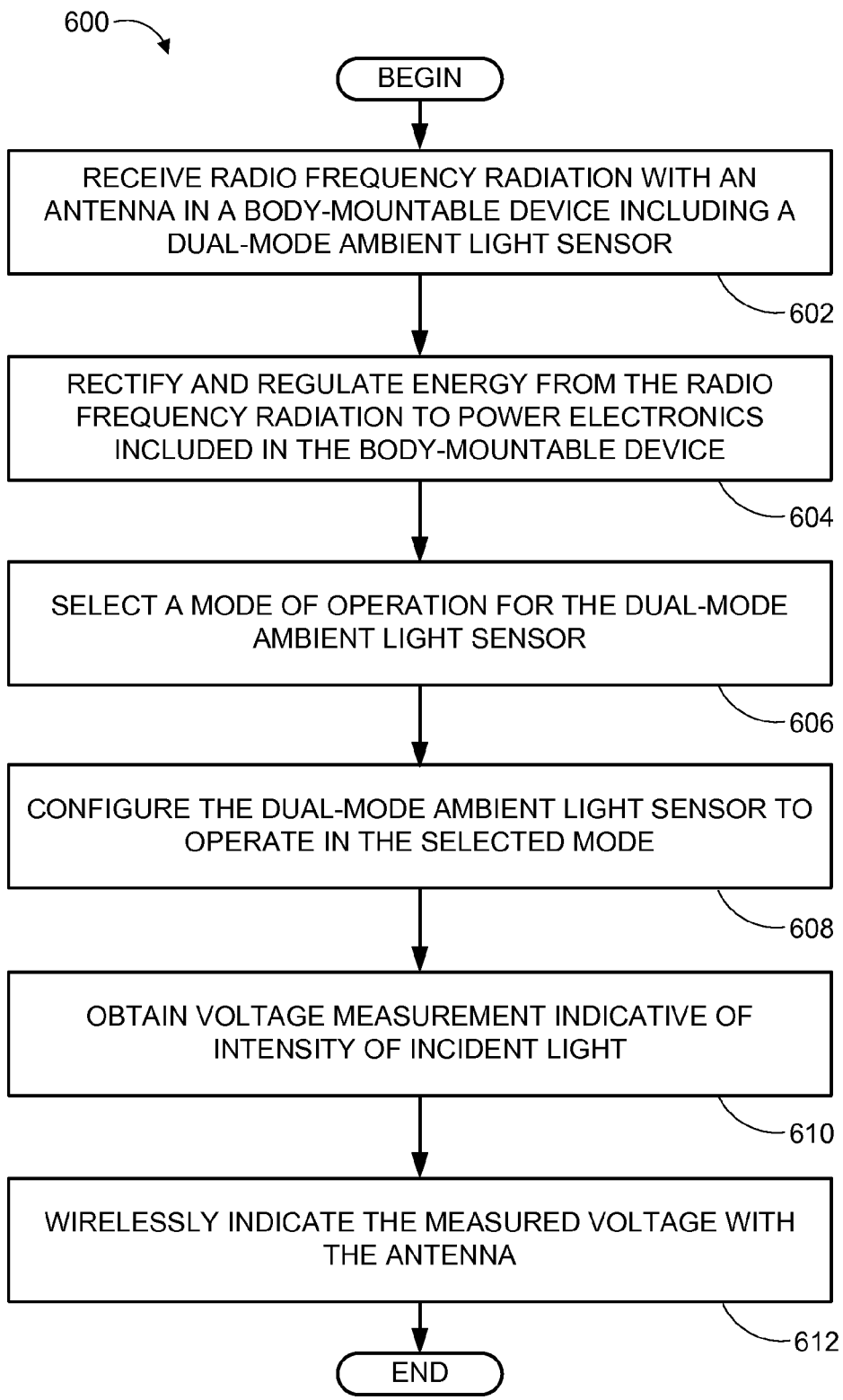
FIG. 6A is a flowchart of an example process for operating a dual-mode ambient light sensor in a body-mountable device.

FIG. 6A is a flowchart of an example process 600 for operating a dual-mode ambient light sensor in a body-mountable device. The process 600 may be performed by any of the body-mountable devices described above that include a dual-mode light sensor circuit. The process 600 is generally described, by way of example, as a process for obtaining a measurement of the intensity of ambient light, although it is noted that light intensity measurements may be obtained for a variety of different purposes.

At block 602, radio frequency radiation is received with an antenna in a body-mountable device including a dual-mode ambient light sensor. For example, with reference to the system 300 described in connection with FIG. 3, incoming radiation 341 may be received via the antenna 312. The received radiation is used to harvest energy to power the body-mountable device, although it is noted that alternative techniques for powering a body-mountable device may be used as alternatives, or perhaps in addition, such as solar cells, batteries, etc.

At block 604, the energy from the radio frequency radiation is rectified and regulated to power the electronics in the body-mountable device. For example, the rectifier 314 and/or regulator 318 can supply DC voltages 330, 332 to power the control components 324 and the dual-mode light sensor 320.

At block 606, the control system can select a mode of operation for the dual-mode ambient light sensor. The control system may include a logic module in the body-mountable device (e.g., hardware logic 324 described in connection with FIG. 3) and/or an external processing system (e.g., a processing system associated with the external reader 340 described in connection with FIG. 3). The control system may select between photoconductive mode and photovoltaic mode based on an expected intensity of ambient light and/or a desired sensitivity to a particular range of intensities. In addition, the control system may select between modes based on a previously obtained measurement. For example, photovoltaic mode may be selected if the expected intensity is greater than can be accurately measured in photoconductive mode, because the expected intensity results in fully discharging the sampling capacitor. The photoconductive mode may be selected if the expected intensity is within a range that can be measured in that mode (i.e., the sampling capacitor is not fully discharged). Moreover, the control system may select an integration time to use when obtaining the measurement in the selected mode, which selection may also be based on an expected light intensity and/or a previously obtained measurement. In some cases, the control system can select a mode of operation and/or integration time dynamically, based on real time measurements, so as to provide a measurement in a desired mode and integration time that allows for the most accurate measurement of the ambient light intensity.

At block 608, the dual-mode light sensor is configured to operate in the selected mode. For example the control system can operate one or more switches to either reverse bias the photodiode, if the photoconductive mode was selected, or to not reverse bias the photodiode if the photovoltaic mode was selected.

At block 610, the control system uses the dual-mode light sensor to obtain a measurement indicative of the intensity of incident light. If the light sensor is being operated in photoconductive mode, then the measurement can be obtained by first pre-charging a sampling capacitor, allowing the sampling capacitor partially discharge through the photodiode during an integration time, and then measuring the remaining voltage on the sampling capacitor following the discharge. The rate of discharge during the integration time is dependent on the magnitude of the reverse photocurrent, which is dependent on the intensity of incident light, and so the voltage measurement can be associated with an intensity of incident light. If the light sensor is being operated in photovoltaic mode, then the measurement can be obtained by referencing the anode or cathode of the photodiode to a reference voltage, waiting during an integration time, and then measuring the voltage on the terminal of the photodiode that is not fixed at the reference voltage. The difference between the measured voltage and the reference voltage is then indicative of the intensity of incident light during the integration time. As noted above, the measured voltage may approach the open circuit voltage for a sufficiently long integration time, but otherwise has a generally logarithmic relationship to the intensity of incident light.

At block 612, the measured voltage can be wirelessly indicated using the antenna. For example, referring again to FIG. 3, upon obtaining a voltage measurement from the light sensor 320, the hardware logic 324 may adjust the impedance of the antenna 312 such that the backscatter radiation 343 from the antenna 312 is modulated in accordance with the measured voltage. The external reader 340 that receives the backscatter 343 can then demodulate the received signal, and map the measured voltage to an intensity of incident light. Although in the alternative, or perhaps in addition, the measured voltage (and/or associated light intensity) may be used to calibrate and/or adjust the operation of systems included in the body-mountable device, such as an imaging system with an adjustable integration time. Such uses of the light sensor measurement may be performed with or without also communicating the measurement to an external reader. Thus, block 612 may be considered optional.

Figure 6B:
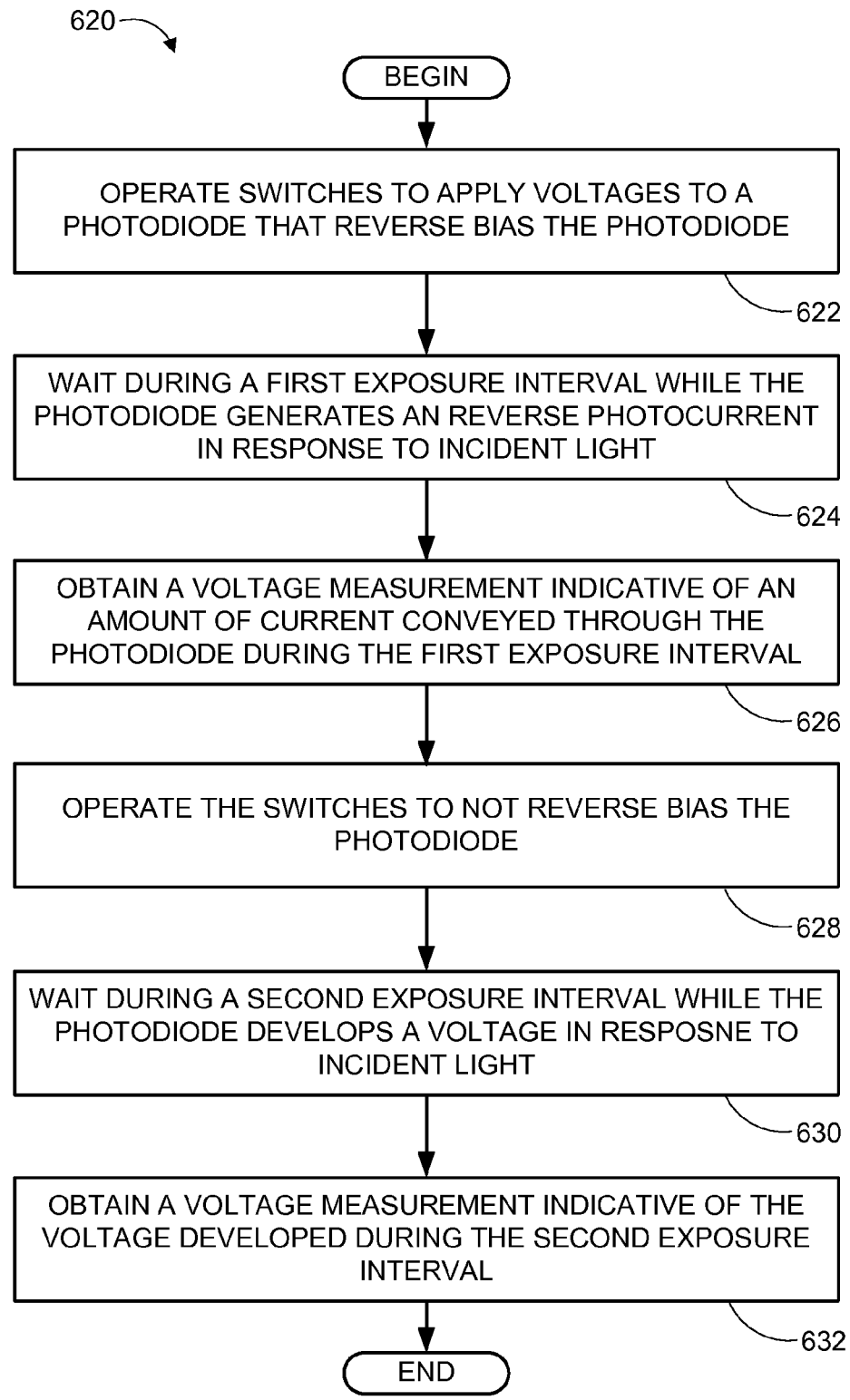
FIG. 6B is a flowchart of an example process for operating a dual-mode ambient light sensor in a body-mountable device.

FIG. 6B is a flowchart of another example process 620 for operating a dual-mode ambient light sensor in a body-mountable device. The process 620 may be performed by any of the body-mountable devices described above that include a dual-mode light sensor circuit. The process 620 is generally described, by way of example, as a process for obtaining a measurement of the intensity of ambient light, although it is noted that light intensity measurements may be obtained for a variety of different purposes.

At block 622, a control system operates switches so as to apply voltages to a photodiode that reverse bias the photodiode. The operation of the switches may involve coupling a first voltage source to an anode of the photodiode, and coupling a second voltage source to the cathode, such that the voltage on the anode is less than the voltage on the cathode of the photodiode. Upon being reverse biased, the photodiode can operate in photoconductive mode.

At block 624, the control system can wait during a first exposure interval while the photodiode generates a reverse photocurrent in response to incident light. The first exposure interval may be preceded by a pre-charge interval in which a capacitor is charged to maintain a reverse bias voltage on the photodiode, as described in connection with FIG. 5B. Following such a pre-charge operation, the capacitor can partially discharge through the photocurrent of the photodiode, which photocurrent is proportionate to the intensity of incident light, as described in connection with FIG. 5C.

At block 626, the control system can obtain a voltage measurement indicative of an amount of current conveyed through the photodiode during the first exposure interval. For instance, in an example in which a capacitor partially discharges through the photodiode during the first exposure interval as a result of the photocurrent, the voltage remaining on the capacitor may be measured following the first exposure interval. For a given duration of the first exposure interval, the sampled voltage provides an indication of the amount of current that was conveyed through the photodiode because the rate of discharge of the capacitor is based on the current. The sampled voltage can then be associated with a value of ambient light intensity by mapping the voltage to an intensity based on the linear relationship, which may itself be based on calibration information or the like.

At block 628, the control system can operate the switches so as to not reverse bias the photodiode. The switches may be configured such either the anode or cathode of the photodiode is coupled to a reference voltage source, which provides a reference with which to compare the voltage on the other terminal. For example, the cathode may be referenced to ground, as described in connection with FIG. 5D.

At block 630, the control system can wait during a second exposure interval while the photodiode develops a voltage across its anode and cathode in response to incident light. The voltage that develops is related to the logarithm of the intensity of incident light, and given a long enough duration, the voltage across the photodiode reaches the open circuit voltage, at which point current ceases to flow through the photodiode.

At block 632, the control system can obtain a voltage measurement indicative of the voltage developed during the second exposure interval. For example, the terminal of the photodiode that is not set to a reference voltage can be coupled to a measurement node, and the voltage can be measured using a voltage sensor or similar device, as described in connection with FIG. 5D. For a given duration of the second exposure interval, the sampled voltage provides an indication of the intensity of incident light. The sampled voltage can then be associated with a value of ambient light intensity by mapping the voltage to an intensity based on the logarithmic relationship, which may itself be based on calibration information or the like.

Moreover, it is particularly noted that while the electronics platform is described herein in some examples as an eye-mountable device or an ophthalmic device, it is noted that the disclosed systems and techniques for small form factor imaging systems can be applied in other contexts as well. For example, contexts in which electronics platforms are operated with low power budgets (e.g., via harvested energy from radiated sources) or are constrained to small form factors (e.g., implantable bio-sensors or other wearable electronics platforms) may employ the systems and processes described herein to measure ambient light intensities in various environments. In one example, an implantable medical device that includes a dual-mode light sensor may be encapsulated in biocompatible material and implanted within a host organism. The implantable medical device may include a circuit configured to detect light received by a photodiode while operating in either photoconductive mode or photovoltaic mode. A control system functions to select a mode of operation, configure the light-sensor circuit accordingly, and obtain a measurement indicative of the intensity of light received. Such control system may also map the obtained measurement to an intensity of incident light. The configurations disclosed herein allow for operating an ambient light sensor with a single photodiode in either photoconductive or in photovoltaic mode. In comparison to a circuit one photodiode dedicated to operating in each mode (e.g., two photodiodes total), the disclosed system therefore requires less space on an integrated circuit, and also consumes less power. The dual-mode light sensor system is therefore helpful in small form factor applications and can also address power budget constraints in low power applications by operating via harvested energy.

Figure 7:
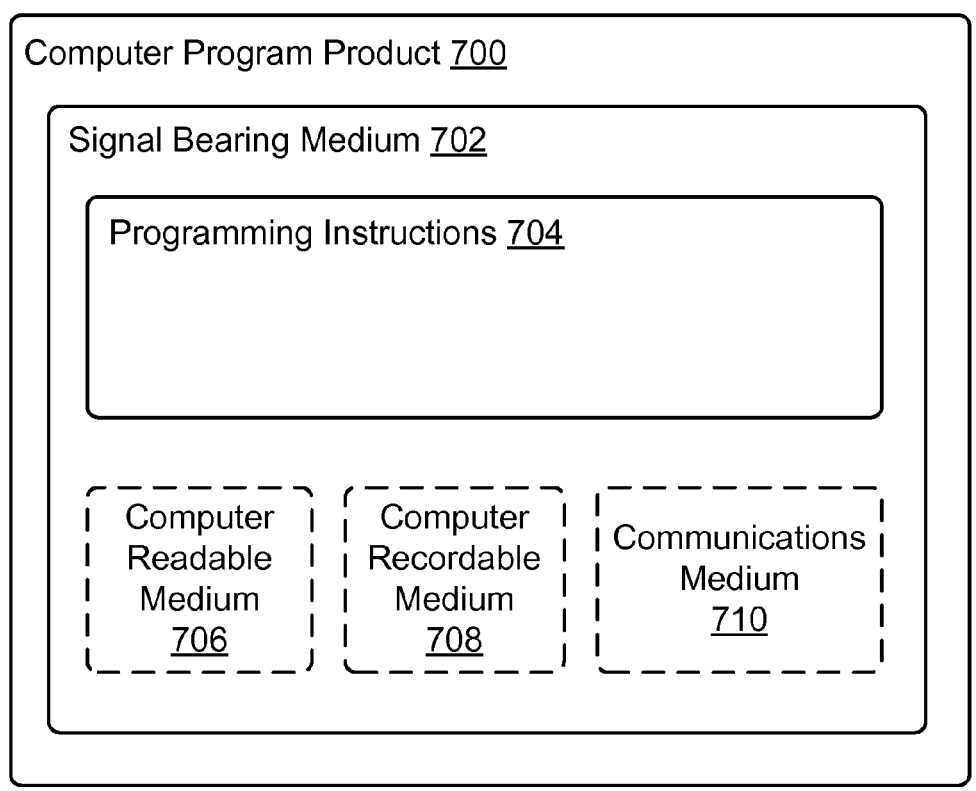
FIG. 7 depicts a computer-readable medium configured according to an example embodiment.

FIG. 7 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 184 stored on the memory storage 182 of the external reader 180 of the system 100). FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a non-transitory computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communications medium 710, such as, but not limited to, a digital and/or an analog communication medium (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor-equipped external reader 180 of FIG. 1 is configured to provide various operations, functions, or actions in response to the programming instructions 704 conveyed to the computing device by one or more of the computer readable medium 706, the computer recordable medium 708, and/or the communications medium 710.

The non-transitory computer readable medium 706 can also be distributed among multiple data storage elements, which could be remotely located from each other. The computing device that executes some or all of the stored instructions could be an external reader, such as the reader 180 illustrated in FIG. 1, or another mobile computing platform, such as a smartphone, tablet device, personal computer, etc. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
   a photodiode having a light-sensitive area, an anode, and a cathode, wherein the photodiode operates in a photoconductive mode when reverse biased, in which the photodiode generates an internal photocurrent directed from the cathode to the anode in response to light incident on the light-sensitive area, and operates in a photovoltaic mode when not reverse biased, in which the photodiode develops a voltage between the cathode and the anode in response to light incident on the light-sensitive area;
   a first voltage source;
   a second voltage source;
   a sampling capacitor coupled to an output node;
   a plurality of switches, including:
      a first switch coupled between the anode of the photodiode and the first voltage source;
      a second switch coupled between the cathode of the photodiode and the first voltage source;
      a third switch coupled between the anode of the photodiode and the sampling capacitor;
      a fourth switch coupled between the cathode of the photodiode and the sampling capacitor; and
      a fifth switch coupled between the second voltage source and either the anode or the cathode of the photodiode; and
   a controller configured to operate the plurality of switches and to obtain voltage measurements of the sampling capacitor, through the output node, so as to alternately: (i) configure the photodiode to operate in the photoconductive mode during a first exposure interval, and obtain, through the output node, a voltage measurement indicative of an amount of current drained through the photodiode during the first exposure interval; and (ii) configure the photodiode to operate in the photovoltaic mode during a second exposure interval, and obtain, through the output node, a voltage measurement indicative of a voltage developed across the photodiode during the second exposure interval.

2. The device of claim 1, wherein the controller is further configured to: (i) obtain a first voltage measurement indicative of incident light intensity while the photodiode operates in either the photoconductive mode or the photovoltaic mode; (ii) select between the photoconductive and photovoltaic modes of operation for a subsequent measurement based on the obtained measurement; and (iii) obtain a second voltage measurement indicative of incident light intensity while the photodiode operates in the selected mode of operation.

3. The device of claim 1, wherein the controller configuring the photodiode to operate in the photoconductive mode during the first exposure interval and obtaining a voltage measurement includes: (i) operating the plurality of switches to connect the photodiode in parallel with the sampling capacitor; (ii) while the photodiode and sampling capacitor are connected in parallel, applying the first and second voltage sources to the photodiode so as to reverse bias the photodiode and also charge the sampling capacitor in accordance with the reverse bias; (iii) ceasing to apply at least one of the first and second voltage sources to the photodiode such that the photodiode is reverse biased by the charged sampling capacitor; (iv) waiting during the first exposure interval for the sampling capacitor to partially discharge through the photodiode via the internal photocurrent of the photodiode; and (v) following the first exposure interval, measuring the voltage of the sampling capacitor.

4. The device of claim 1, wherein the controller configuring the photodiode to operate in the photovoltaic mode during the second exposure interval and obtaining a voltage measurement includes: (i) operating the plurality of switches to connect the photodiode in parallel with the sampling capacitor; (ii) waiting during the second exposure interval for the sampling capacitor to develop a voltage between the anode and the cathode and also charge the sampling capacitor in accordance with the developed voltage; and (iii) following the second exposure interval, measuring the voltage of the sampling capacitor.

5. The device of claim 1, wherein the controller is further configured to: (i) obtain a voltage measurement while the photodiode operates in either the photoconductive mode or the photovoltaic mode; and (ii) estimate, based on the voltage measurement, an intensity of incident light.

6. The device of claim 1, further comprising:
   an analog to digital converter coupled to the output node; and
   wherein the controller is configured to use the analog to digital converter to obtain the voltage measurements.

7. The device of claim 1, wherein the plurality of switches includes a plurality of transistors configured to be separately controlled by the controller using respective control lines.

8. The device of claim 1, further comprising:
   a polymeric material formed to include a body-mountable surface; and
   a substrate at least partially embedded within the polymeric material, wherein the photodiode, the first and second voltage sources, the sampling capacitor, and the controller are disposed on the substrate.

9. The device of claim 8, wherein the body-mountable surface is configured to be removably mounted over an eye.

10. The device of claim 8, further comprising:
    an antenna disposed on the substrate; and
    wherein the controller is further configured to use the antenna to indicate the voltage measurements obtained through the output node.

11. The device of claim 1, wherein the first voltage source applies a ground voltage and the second voltage source applies a voltage that is greater than or less than the ground voltage.

12. A method comprising:

operating one or more switches to connect a photodiode in parallel with a sampling capacitor, wherein the photodiode has a light-sensitive area, an anode, and a cathode;

while the photodiode and sampling capacitor are connected in parallel, applying the first and second voltage sources to the photodiode so as to reverse bias the photodiode and also charge the sampling capacitor in accordance with the reverse bias;

ceasing to apply at least one of the first and second voltage sources to the photodiode such that the photodiode is reverse biased by the charged sampling capacitor;

waiting, during a first exposure interval in which the photodiode is reverse biased, while the photodiode generates an internal reverse photocurrent in response to light incident on the light-sensitive area;

obtaining a voltage measurement indicative of an amount of current conveyed through the photodiode during the first exposure interval;

operating the one or more switches so as to not reverse bias the photodiode;

waiting, during a second exposure interval in which the photodiode is not reverse biased, while the photodiode develops a voltage between the anode and a cathode of the photodiode in response to light incident on the light-sensitive; and obtaining a voltage measurement indicative of the voltage developed across the photodiode during the second exposure interval.

13. The method of claim 12, wherein the photodiode is configured to: (i) while the photodiode is reverse biased, operate in a photoconductive mode, in which the photodiode generates an internal photocurrent directed from the cathode to the anode in response to light incident on the light-sensitive area; and (ii) while the photodiode is not reverse biased, operate in a photovoltaic mode, in which the photodiode develops a voltage between the cathode and the anode in response to light incident on the light-sensitive area; the method further comprising:

obtaining a first voltage measurement indicative of incident light intensity while the photodiode operates in either the photoconductive mode or the photovoltaic mode selecting between the photoconductive and photovoltaic modes of operation for a subsequent measurement based on the obtained measurement; and obtaining a second voltage measurement indicative of incident light intensity while the photodiode operates in the selected mode of operation.

14. The method of claim 12, wherein waiting, during the first exposure interval, includes waiting for the sampling capacitor to partially discharge through the photodiode via the internal photocurrent of the photodiode; and wherein obtaining the voltage measurement indicative of an amount of current conveyed through the photodiode during the first exposure interval includes, following the first exposure interval, measuring the voltage of the sampling capacitor.

15. The method of claim 12, wherein operating the one or more switches so as to not reverse bias the photodiode includes operating the one or more switches to connect the photodiode in parallel with the sampling capacitor;

wherein waiting, during the second exposure interval, includes waiting for the sampling capacitor to develop a voltage between the anode and the cathode and also charge the sampling capacitor in accordance with the developed voltage;

wherein obtaining a voltage measurement indicative of the voltage developed across the photodiode during the second exposure interval includes, following the second exposure interval, measuring the voltage of the sampling capacitor.

16. The method of claim 12, further comprising:

obtaining a voltage measurement while the photodiode operates in either the photoconductive mode or the photovoltaic mode; and estimating, based on the voltage measurement, an intensity of incident light.

17. The method of claim 12, further comprising:

indicating the obtained voltage measurement.

18. A body-mountable device comprising:

a polymeric material formed to include a body-mountable surface;

a substrate at least partially embedded within the polymeric material;

an antenna disposed on the substrate;

a photodiode disposed on the substrate, the photodiode having a light-sensitive area, an anode, and a cathode, wherein the photodiode operates in a photoconductive mode when reverse biased, in which the photodiode generates an internal photocurrent directed from the cathode to the anode in response to light incident on the light-sensitive area, and operates in a photovoltaic mode when not reverse biased, in which the photodiode develops a voltage between the cathode and the anode in response to light incident on the light-sensitive area;

a first voltage source;

a second voltage source;

a sampling capacitor coupled an output node;

a plurality of switches, including:

a first switch coupled between the anode of the photodiode and the first voltage source;

a second switch coupled between the cathode of the photodiode and the first voltage source;

a third switch coupled between the anode of the photodiode and the sampling capacitor;

a fourth switch coupled between the cathode of the photodiode and the sampling capacitor; and a fifth switch coupled between the second voltage source and either the anode or the cathode of the photodiode; and a controller electrically connected to the antenna, the controller configured to:

(i) operate the plurality of switches and to obtain voltage measurements of the sampling capacitor, through the output node, so as to alternately: (a) configure the photodiode to operate in the photoconductive mode during a first exposure interval, and obtain, through the output node, a voltage measurement indicative of an amount of current drained through the photodiode during the first exposure interval; and (b) configure the photodiode to operate in the photovoltaic mode during a second exposure interval, and obtain, through the output node, a voltage measurement indicative of a voltage developed across the photodiode during the second exposure interval; and
(ii) use the antenna to indicate the obtained voltage measurement.

19. The body-mountable device of claim 18, wherein the polymeric material is configured to be removably mounted over a corneal surface.

* * * * *